(12) United States Patent
Gorrell

(10) Patent No.: US 7,746,532 B2
(45) Date of Patent: Jun. 29, 2010

(54) ELECTRO-OPTICAL SWITCHING SYSTEM AND METHOD

(75) Inventor: Jonathan Gorrell, Gainesville, FL (US)

(73) Assignee: Virgin Island Microsystems, Inc., St. Thomas, VI (US)

(*) Notice: Subject to any disclaimer, the term of this patent is extended or adjusted under 35 U.S.C. 154(b) by 770 days.

(21) Appl. No.: 11/418,100

(22) Filed: May 5, 2006

(65) Prior Publication Data

US 2007/0258126 A1 Nov. 8, 2007

(51) Int. Cl.
G02F 1/03 (2006.01)
H01J 23/00 (2006.01)

(52) U.S. Cl. .................. 359/247; 315/500

(58) Field of Classification Search .......... 359/320, 359/315, 237, 298, 257, 32, 31, 23, 29, 25, 359/238, 246, 247; 315/3.5, 3.6, 501, 507, 315/500

See application file for complete search history.

(56) References Cited

U.S. PATENT DOCUMENTS

| | | | |
|---|---|---|---|
| 1,948,384 A | 2/1934 | Lawrence |
| 2,307,086 A | 1/1943 | Varian et al. |
| 2,431,396 A | 11/1947 | Hansell |
| 2,473,477 A | 6/1949 | Smith |
| 2,634,372 A | 4/1953 | Salisbury |
| 2,932,798 A | 4/1960 | Kerst et al. |
| 2,944,183 A | 7/1960 | Drexler |
| 2,966,611 A | 12/1960 | Sandstrom |
| 3,231,779 A | 1/1966 | White |
| 3,297,905 A | 1/1967 | Rockwell et al. |
| 3,315,117 A | 4/1967 | Udelson |
| 3,387,169 A | 6/1968 | Farney |
| 3,543,147 A | 11/1970 | Kovarik |
| 3,546,524 A | 12/1970 | Stark |
| 3,560,694 A | 2/1971 | White |
| 3,571,642 A | 3/1971 | Westcott |
| 3,586,899 A | 6/1971 | Fleisher |
| 3,761,828 A | 9/1973 | Pollard et al. |
| 3,886,399 A | 5/1975 | Symons |
| 3,923,568 A | 12/1975 | Bersin |
| 3,989,347 A | 11/1976 | Eschler |
| 4,053,845 A | 10/1977 | Gould |
| 4,282,436 A | 8/1981 | Kapetanakos |

(Continued)

FOREIGN PATENT DOCUMENTS

EP 0237559 B1 12/1991

(Continued)

OTHER PUBLICATIONS

U.S. Appl. No. 11/418,082, filed May 5, 2006, Gorrell et al.

(Continued)

*Primary Examiner*—Douglas W Owens
*Assistant Examiner*—Minh D A
(74) *Attorney, Agent, or Firm*—Davidson Berquist Jackson & Gowdey, LLP

(57) ABSTRACT

In an optical switch, a set of coherent electromagnetic radiation is selectively delayed and recombined to produce constructively or destructively combined radiation. When the radiation is constructively combined, a signal is transmitted out of the switch to a remote receiver. When the radiation is destructively combined, a signal is not transmitted out of the switch to a remote receiver.

10 Claims, 14 Drawing Sheets

U.S. PATENT DOCUMENTS

| | | | |
|---|---|---|---|
| 4,450,554 A | 5/1984 | Steensma et al. |
| 4,453,108 A | 6/1984 | Freeman, Jr. |
| 4,482,779 A | 11/1984 | Anderson |
| 4,528,659 A | 7/1985 | Jones, Jr. |
| 4,589,107 A | 5/1986 | Middleton et al. |
| 4,598,397 A | 7/1986 | Nelson et al. |
| 4,630,262 A | 12/1986 | Callens et al. |
| 4,652,703 A | 3/1987 | Lu et al. |
| 4,661,783 A | 4/1987 | Gover et al. |
| 4,704,583 A | 11/1987 | Gould |
| 4,712,042 A | 12/1987 | Hamm |
| 4,713,581 A | 12/1987 | Haimson |
| 4,727,550 A | 2/1988 | Chang et al. |
| 4,740,963 A | 4/1988 | Eckley |
| 4,740,973 A | 4/1988 | Madey |
| 4,746,201 A | 5/1988 | Gould |
| 4,761,059 A | 8/1988 | Yeh et al. |
| 4,782,485 A | 11/1988 | Gollub |
| 4,789,945 A | 12/1988 | Niijima |
| 4,806,859 A | 2/1989 | Hetrick |
| 4,809,271 A | 2/1989 | Kondo et al. |
| 4,813,040 A | 3/1989 | Futato |
| 4,819,228 A | 4/1989 | Baran et al. |
| 4,829,527 A | 5/1989 | Wortman et al. |
| 4,838,021 A | 6/1989 | Beattie |
| 4,841,538 A | 6/1989 | Yanabu et al. |
| 4,864,131 A | 9/1989 | Rich et al. |
| 4,866,704 A | 9/1989 | Bergman |
| 4,866,732 A | 9/1989 | Carey et al. |
| 4,873,715 A | 10/1989 | Shibata |
| 4,887,265 A | 12/1989 | Felix |
| 4,890,282 A | 12/1989 | Lambert et al. |
| 4,898,022 A | 2/1990 | Yumoto et al. |
| 4,912,705 A | 3/1990 | Paneth et al. |
| 4,932,022 A | 6/1990 | Keeney et al. |
| 4,981,371 A | 1/1991 | Gurak et al. |
| 5,023,563 A | 6/1991 | Harvey et al. |
| 5,036,513 A | 7/1991 | Greenblatt |
| 5,065,425 A | 11/1991 | Lecomte et al. |
| 5,113,141 A | 5/1992 | Swenson |
| 5,121,385 A | 6/1992 | Tominaga et al. |
| 5,127,001 A | 6/1992 | Steagall et al. |
| 5,128,729 A | 7/1992 | Alonas et al. |
| 5,130,985 A | 7/1992 | Kondo et al. |
| 5,150,410 A | 9/1992 | Bertrand |
| 5,155,726 A | 10/1992 | Spinney et al. |
| 5,157,000 A | 10/1992 | Elkind et al. |
| 5,163,118 A | 11/1992 | Lorenzo et al. |
| 5,185,073 A | 2/1993 | Bindra |
| 5,187,591 A | 2/1993 | Guy et al. |
| 5,199,918 A | 4/1993 | Kumar |
| 5,214,650 A | 5/1993 | Renner et al. |
| 5,233,623 A | 8/1993 | Chang |
| 5,235,248 A | 8/1993 | Clark et al. |
| 5,262,656 A | 11/1993 | Blondeau et al. |
| 5,263,043 A | 11/1993 | Walsh |
| 5,268,693 A | 12/1993 | Walsh |
| 5,268,788 A | 12/1993 | Fox et al. |
| 5,282,197 A | 1/1994 | Kreitzer |
| 5,283,819 A | 2/1994 | Glick et al. |
| 5,293,175 A | 3/1994 | Hemmie et al. |
| 5,302,240 A | 4/1994 | Hori et al. |
| 5,305,312 A | 4/1994 | Fornek et al. |
| 5,341,374 A | 8/1994 | Lewen et al. |
| 5,354,709 A | 10/1994 | Lorenzo et al. |
| 5,446,814 A | 8/1995 | Kuo et al. |
| 5,504,341 A | 4/1996 | Glavish |
| 5,578,909 A | 11/1996 | Billen |
| 5,604,352 A | 2/1997 | Schuetz |
| 5,608,263 A | 3/1997 | Drayton et al. |
| 5,666,020 A | 9/1997 | Takemura |
| 5,668,368 A | 9/1997 | Sakai et al. |
| 5,705,443 A | 1/1998 | Stauf et al. |
| 5,737,458 A | 4/1998 | Wojnarowski et al. |
| 5,744,919 A | 4/1998 | Mishin et al. |
| 5,757,009 A | 5/1998 | Walstrom |
| 5,767,013 A | 6/1998 | Park |
| 5,780,970 A | 7/1998 | Singh et al. |
| 5,790,585 A | 8/1998 | Walsh |
| 5,811,943 A | 9/1998 | Mishin et al. |
| 5,821,836 A | 10/1998 | Katehi et al. |
| 5,821,902 A | 10/1998 | Keen |
| 5,825,140 A | 10/1998 | Fujisawa |
| 5,831,270 A | 11/1998 | Nakasuji |
| 5,847,745 A | 12/1998 | Shimizu et al. |
| 5,889,449 A | 3/1999 | Fiedziuszko |
| 5,889,797 A | 3/1999 | Nguyen |
| 5,902,489 A | 5/1999 | Yasuda et al. |
| 5,963,857 A | 10/1999 | Greywall |
| 5,972,193 A | 10/1999 | Chou et al. |
| 6,005,347 A | 12/1999 | Lee |
| 6,008,496 A | 12/1999 | Winefordner et al. |
| 6,040,625 A | 3/2000 | Ip |
| 6,060,833 A | 5/2000 | Velazco |
| 6,080,529 A | 6/2000 | Ye et al. |
| 6,117,784 A | 9/2000 | Uzoh |
| 6,139,760 A | 10/2000 | Shim et al. |
| 6,180,415 B1 | 1/2001 | Schultz et al. |
| 6,195,199 B1 | 2/2001 | Yamada |
| 6,222,866 B1 | 4/2001 | Seko |
| 6,278,239 B1 | 8/2001 | Caporaso et al. |
| 6,281,769 B1 | 8/2001 | Fiedziuszko |
| 6,297,511 B1 | 10/2001 | Syllaios et al. |
| 6,301,041 B1 | 10/2001 | Yamada |
| 6,309,528 B1 | 10/2001 | Taylor et al. |
| 6,316,876 B1 | 11/2001 | Tanabe |
| 6,338,968 B1 | 1/2002 | Hefti |
| 6,370,306 B1 | 4/2002 | Sato et al. |
| 6,373,194 B1 | 4/2002 | Small |
| 6,376,258 B2 | 4/2002 | Hefti |
| 6,407,516 B1 | 6/2002 | Victor |
| 6,441,298 B1 | 8/2002 | Thio |
| 6,448,850 B1 | 9/2002 | Yamada |
| 6,453,087 B2 | 9/2002 | Frish et al. |
| 6,470,198 B1 | 10/2002 | Kintaka et al. |
| 6,504,303 B2 | 1/2003 | Small |
| 6,525,477 B2 | 2/2003 | Small |
| 6,534,766 B2 | 3/2003 | Abe et al. |
| 6,545,425 B2 | 4/2003 | Victor |
| 6,552,320 B1 | 4/2003 | Pan |
| 6,577,040 B2 | 6/2003 | Nguyen |
| 6,580,075 B2 | 6/2003 | Kametani et al. |
| 6,603,781 B1 | 8/2003 | Stinson et al. |
| 6,603,915 B2 | 8/2003 | Glebov et al. |
| 6,624,916 B1 | 9/2003 | Green et al. |
| 6,636,185 B1 | 10/2003 | Spitzer et al. |
| 6,636,534 B2 * | 10/2003 | Madey et al. ............ 372/2 |
| 6,636,653 B2 | 10/2003 | Miracky et al. |
| 6,640,023 B2 | 10/2003 | Miller et al. |
| 6,642,907 B2 | 11/2003 | Hamada et al. |
| 6,687,034 B2 | 2/2004 | Wine et al. |
| 6,700,748 B1 | 3/2004 | Cowles et al. |
| 6,724,486 B1 | 4/2004 | Shull et al. |
| 6,738,176 B2 | 5/2004 | Rabinowitz et al. |
| 6,741,781 B2 | 5/2004 | Furuyama |
| 6,777,244 B2 | 8/2004 | Pepper et al. |
| 6,782,205 B2 | 8/2004 | Trisnadi et al. |
| 6,791,438 B2 | 9/2004 | Takahashi et al. |
| 6,800,877 B2 | 10/2004 | Victor et al. |
| 6,801,002 B2 | 10/2004 | Victor et al. |
| 6,819,432 B2 * | 11/2004 | Pepper et al. ............ 356/498 |
| 6,829,286 B1 | 12/2004 | Guilfoyle et al. |
| 6,834,152 B2 | 12/2004 | Gunn et al. |
| 6,870,438 B1 | 3/2005 | Shino et al. |

| | | | | | | |
|---|---|---|---|---|---|---|
| 6,871,025 B2 | 3/2005 | Maleki et al. | | 2004/0108823 A1 | 6/2004 | Amaldi et al. |
| 6,885,262 B2 | 4/2005 | Nishimura et al. | | 2004/0136715 A1 | 7/2004 | Kondo |
| 6,900,447 B2 * | 5/2005 | Gerlach et al. ............ 250/494.1 | | 2004/0150991 A1 | 8/2004 | Ouderkirk et al. |
| 6,909,092 B2 | 6/2005 | Nagahama | | 2004/0171272 A1 | 9/2004 | Jin et al. |
| 6,909,104 B1 | 6/2005 | Koops | | 2004/0180244 A1 | 9/2004 | Tour et al. |
| 6,924,920 B2 * | 8/2005 | Zhilkov ........................ 359/293 | | 2004/0184270 A1 | 9/2004 | Halter |
| 6,936,981 B2 * | 8/2005 | Gesley ........................ 315/500 | | 2004/0213375 A1 | 10/2004 | Bjorkholm et al. |
| 6,943,650 B2 | 9/2005 | Ramprasad et al. | | 2004/0217297 A1 | 11/2004 | Moses et al. |
| 6,944,369 B2 | 9/2005 | Deliwala | | 2004/0218651 A1 | 11/2004 | Iwasaki et al. |
| 6,952,492 B2 | 10/2005 | Tanaka et al. | | 2004/0231996 A1 | 11/2004 | Webb |
| 6,953,291 B2 | 10/2005 | Liu | | 2004/0240035 A1 | 12/2004 | Zhilkov |
| 6,954,515 B2 | 10/2005 | Bjorkholm et al. | | 2004/0264867 A1 | 12/2004 | Kondo |
| 6,965,284 B2 | 11/2005 | Maekawa et al. | | 2005/0023145 A1 | 2/2005 | Cohen et al. |
| 6,965,625 B2 | 11/2005 | Mross et al. | | 2005/0045821 A1 | 3/2005 | Noji et al. |
| 6,972,439 B1 | 12/2005 | Kim et al. | | 2005/0045832 A1 | 3/2005 | Kelly et al. |
| 6,995,406 B2 | 2/2006 | Tojo et al. | | 2005/0054151 A1 | 3/2005 | Lowther et al. |
| 7,010,183 B2 | 3/2006 | Estes et al. | | 2005/0067286 A1 | 3/2005 | Ahn et al. |
| 7,064,500 B2 | 6/2006 | Victor et al. | | 2005/0082469 A1 | 4/2005 | Carlo |
| 7,068,948 B2 * | 6/2006 | Wei et al. ..................... 398/184 | | 2005/0092929 A1 | 5/2005 | Schneiker |
| 7,092,588 B2 | 8/2006 | Kondo | | 2005/0104684 A1 | 5/2005 | Wojcik |
| 7,092,603 B2 | 8/2006 | Glebov et al. | | 2005/0105690 A1 | 5/2005 | Pau et al. |
| 7,122,978 B2 | 10/2006 | Nakanishi et al. | | 2005/0145882 A1 | 7/2005 | Taylor et al. |
| 7,130,102 B2 | 10/2006 | Rabinowitz | | 2005/0152635 A1 | 7/2005 | Paddon et al. |
| 7,177,515 B2 | 2/2007 | Estes et al. | | 2005/0162104 A1 | 7/2005 | Victor et al. |
| 7,194,798 B2 | 3/2007 | Bonhote et al. | | 2005/0190637 A1 | 9/2005 | Ichimura et al. |
| 7,230,201 B1 | 6/2007 | Miley et al. | | 2005/0194258 A1 | 9/2005 | Cohen et al. |
| 7,253,426 B2 | 8/2007 | Gorrell et al. | | 2005/0201707 A1 | 9/2005 | Glebov et al. |
| 7,267,459 B2 | 9/2007 | Matheson | | 2005/0201717 A1 | 9/2005 | Matsumura et al. |
| 7,267,461 B2 | 9/2007 | Kan et al. | | 2005/0212503 A1 | 9/2005 | Deibele |
| 7,309,953 B2 | 12/2007 | Tiberi et al. | | 2005/0231138 A1 | 10/2005 | Nakanishi et al. |
| 7,342,441 B2 | 3/2008 | Gorrell et al. | | 2005/0249451 A1 | 11/2005 | Baehr-Jones et al. |
| 7,362,972 B2 | 4/2008 | Yavor et al. | | 2005/0285541 A1 | 12/2005 | LeChevalier |
| 7,375,631 B2 | 5/2008 | Moskowitz et al. | | 2006/0007730 A1 | 1/2006 | Nakamura et al. |
| 7,436,177 B2 | 10/2008 | Gorrell et al. | | 2006/0018619 A1 | 1/2006 | Helffrich et al. |
| 7,442,940 B2 | 10/2008 | Gorrell et al. | | 2006/0035173 A1 | 2/2006 | Davidson et al. |
| 7,443,358 B2 | 10/2008 | Gorrell et al. | | 2006/0045418 A1 | 3/2006 | Cho et al. |
| 7,470,920 B2 | 12/2008 | Gorrell et al. | | 2006/0050269 A1 | 3/2006 | Brownell |
| 7,473,917 B2 | 1/2009 | Singh | | 2006/0060782 A1 | 3/2006 | Khursheed |
| 7,586,097 B2 | 9/2009 | Gorrell et al. | | 2006/0062258 A1 | 3/2006 | Brau et al. |
| 7,586,167 B2 | 9/2009 | Gorrell et al. | | 2006/0131176 A1 | 6/2006 | Hsu |
| 2001/0002315 A1 | 5/2001 | Schultz et al. | | 2006/0131695 A1 | 6/2006 | Kuekes et al. |
| 2001/0025925 A1 | 10/2001 | Abe et al. | | 2006/0159131 A1 | 7/2006 | Liu et al. |
| 2002/0009723 A1 | 1/2002 | Hefti | | 2006/0164496 A1 | 7/2006 | Tokutake et al. |
| 2002/0027481 A1 | 3/2002 | Fiedziuszko | | 2006/0187794 A1 | 8/2006 | Harvey et al. |
| 2002/0036121 A1 | 3/2002 | Ball et al. | | 2006/0208667 A1 | 9/2006 | Lys et al. |
| 2002/0036264 A1 | 3/2002 | Nakasuji et al. | | 2006/0216940 A1 | 9/2006 | Gorrell et al. |
| 2002/0053638 A1 | 5/2002 | Winkler et al. | | 2006/0243925 A1 | 11/2006 | Barker et al. |
| 2002/0068018 A1 | 6/2002 | Pepper et al. | | 2006/0274922 A1 | 12/2006 | Ragsdale |
| 2002/0070671 A1 | 6/2002 | Small | | 2007/0003781 A1 | 1/2007 | de Rochemont |
| 2002/0071457 A1 | 6/2002 | Hogan | | 2007/0013765 A1 | 1/2007 | Hudson et al. |
| 2002/0122531 A1 | 9/2002 | Whitham | | 2007/0075263 A1 | 4/2007 | Gorrell et al. |
| 2002/0135665 A1 | 9/2002 | Gardner | | 2007/0075264 A1 | 4/2007 | Gorrell et al. |
| 2002/0139961 A1 | 10/2002 | Kinoshita et al. | | 2007/0085039 A1 | 4/2007 | Gorrell et al. |
| 2002/0158295 A1 | 10/2002 | Armgarth et al. | | 2007/0086915 A1 | 4/2007 | LeBoeuf et al. |
| 2002/0191650 A1 | 12/2002 | Madey et al. | | 2007/0116420 A1 | 5/2007 | Estes et al. |
| 2003/0010979 A1 | 1/2003 | Pardo | | 2007/0146704 A1 | 6/2007 | Schmidt et al. |
| 2003/0012925 A1 | 1/2003 | Gorrell | | 2007/0152176 A1 | 7/2007 | Gorrell et al. |
| 2003/0016421 A1 | 1/2003 | Small | | 2007/0154846 A1 | 7/2007 | Gorrell et al. |
| 2003/0034535 A1 | 2/2003 | Barenburu et al. | | 2007/0194357 A1 | 8/2007 | Oohashi |
| 2003/0103150 A1 | 6/2003 | Catrysse et al. | | 2007/0200940 A1 | 8/2007 | Gruhlke et al. |
| 2003/0106998 A1 | 6/2003 | Colbert et al. | | 2007/0238037 A1 | 10/2007 | Wuister et al. |
| 2003/0155521 A1 | 8/2003 | Feuerbaum | | 2007/0252983 A1 | 11/2007 | Tong et al. |
| 2003/0158474 A1 | 8/2003 | Scherer et al. | | 2007/0258492 A1 | 11/2007 | Gorrell |
| 2003/0164947 A1 | 9/2003 | Vaupel | | 2007/0258689 A1 | 11/2007 | Gorrell et al. |
| 2003/0179974 A1 | 9/2003 | Estes et al. | | 2007/0258690 A1 | 11/2007 | Gorrell et al. |
| 2003/0206708 A1 | 11/2003 | Estes et al. | | 2007/0259641 A1 | 11/2007 | Gorrell |
| 2003/0214695 A1 | 11/2003 | Abramson et al. | | 2007/0264023 A1 | 11/2007 | Gorrell et al. |
| 2004/0061053 A1 | 4/2004 | Taniguchi et al. | | 2007/0264030 A1 | 11/2007 | Gorrell et al. |
| 2004/0080285 A1 | 4/2004 | Victor et al. | | 2007/0282030 A1 | 12/2007 | Anderson et al. |
| 2004/0085159 A1 | 5/2004 | Kubena et al. | | 2007/0284527 A1 | 12/2007 | Zani et al. |
| 2004/0092104 A1 | 5/2004 | Gunn, III et al. | | | | |
| 2004/0108471 A1 | 6/2004 | Luo et al. | | | | |
| 2004/0108473 A1 | 6/2004 | Melnychuk et al. | | | | |

2008/0069509 A1 3/2008 Gorrell et al.

FOREIGN PATENT DOCUMENTS

| JP | 2004-32323 A | 1/2004 |
|---|---|---|
| WO | WO 87/01873 | 3/1987 |
| WO | WO 93/21663 A1 | 10/1993 |
| WO | WO 00/72413 | 11/2000 |
| WO | WO 02/25785 | 3/2002 |
| WO | WO 02/077607 | 10/2002 |
| WO | WO 2004/086560 | 10/2004 |
| WO | WO 2005/015143 A2 | 2/2005 |
| WO | WO 2005/098966 | 10/2005 |
| WO | WO 2006/042239 A2 | 4/2006 |
| WO | WO 2007/081389 | 7/2007 |
| WO | WO 2007/081390 | 7/2007 |
| WO | WO 2007/081391 | 7/2007 |

OTHER PUBLICATIONS

J. C. Palais, "Fiber optic communications," Prentice Hall, New Jersey, 1998, pp. 156-158.
Search Report and Written Opinion mailed Dec. 20, 2007 in PCT Appln. No. PCT/US2006/022771.
Search Report and Written Opinion mailed Jan. 31, 2008 in PCT Appln. No. PCT/US2006/027427.
Search Report and Written Opinion mailed Jan. 8, 2008 in PCT Appln. No. PCT/US2006/028741.
Search Report and Written Opinion mailed Mar. 11, 2008 in PCT Appln. No. PCT/US2006/022679.
Lee Kwang-Cheol et al., "Deep X-Ray Mask with Integrated Actuator for 3D Microfabrication", Conference: Pacific Rim Workshop on Transducers and Micro/Nano Technologies, (Xiamen CHN), Jul. 22, 2002.
Markoff, John, "A Chip That Can Transfer Data Using Laser Light," The New York Times, Sep. 18, 2006.
S.M. Sze, "Semiconductor Devices Physics and Technology", 2nd Edition, Chapters 9 and 12, Copyright 1985, 2002.
Search Report and Written Opinion mailed Feb. 12, 2007 in PCT Appln. No. PCT/US2006/022682.
Search Report and Written Opinion mailed Feb. 20, 2007 in PCT Appln. No. PCT/US2006/022676.
Search Report and Written Opinion mailed Feb. 20, 2007 in PCT Appln. No. PCT/US2006/022772.
Search Report and Written Opinion mailed Feb. 20, 2007 in PCT Appln. No. PCT/US2006/022780.
Search Report and Written Opinion mailed Feb. 21, 2007 in PCT Appln. No. PCT/US2006/022684.
Search Report and Written Opinion mailed Jan. 17, 2007 in PCT Appln. No. PCT/US2006/022777.
Search Report and Written Opinion mailed Jan. 23, 2007 in PCT Appln. No. PCT/US2006/022781.
Search Report and Written Opinion mailed Mar. 7, 2007 in PCT Appln. No. PCT/US2006/022775.
Speller et al., "A Low-Noise MEMS Accelerometer for Unattended Ground Sensor Applications", Applied MEMS Inc., 12200 Parc Crest, Stafford, TX, USA 77477.
Thurn-Albrecht et al., "Ultrahigh-Density Nanowire Arrays Grown in Self-Assembled Diblock Copolymer Templates", Science 290. 5499, Dec. 15, 2000, pp. 2126-2129.
Search Report and Written Opinion mailed Apr. 23, 2008 in PCT Appln. No. PCT/US2006/022678.
Search Report and Written Opinion mailed Jun. 18, 2008 in PCT Appln. No. PCT/US2006/027430.
Search Report and Written Opinion mailed Jun. 3, 2008 in PCT Appln. No. PCT/US2006/022783.
Search Report and Written Opinion mailed Mar. 24, 2008 in PCT Appln. No. PCT/US2006/022784.
Search Report and Written Opinion mailed May 21, 2008 in PCT Appln. No. PCT/US2006/023279.
Search Report and Written Opinion mailed May 22, 2008 in PCT Appln. No. PCT/US2006/022685.

"Array of Nanoklystrons for Frequency Agility or Redundancy," NASA's Jet Propulsion Laboratory, NASA Tech Briefs, NPO-21033. 2001.
"Frequently Asked Questions," Luxtera Inc., found at http://www.luxtera.com/technology_faq.htm, printed on Dec. 2, 2005, 4 pages.
"Hardware Development Programs," Calabazas Creek Research, Inc. found at http://calcreek.com/hardware.html.
"Technology Overview," Luxtera, Inc., found at http://www.luxtera.com/technology.htm, printed on Dec. 2, 2005, 1 page.
"Antenna Arrays." May 18, 2002. www.tpub.com/content/neets/14183/css/14183_159.htm.
"Diffraction Grating," hyperphysics.phy-astr.gsu.edu/hbase/phyopt/grating.html.
Alford, T.L. et al., "Advanced silver-based metallization patterning for ULSI applications," Microelectronic Engineering 55, 2001, pp. 383-388, Elsevier Science B.V.
Amato, Ivan, "An Everyman's Free-Electron Laser?" Science, New Series, Oct. 16, 1992, p. 401, vol. 258 No. 5081, American Association for the Advancement of Science.
Andrews, H.L. et al., "Dispersion and Attenuation in a Smith-Purcell Free Electron Laser," The American Physical Society, Physical Review Special Topics—Accelerators and Beams 8 (2005), pp. 050703-1-050703-9.
Backe, H. et al. "Investigation of Far-Infrared Smith-Purcell Radiation at the 3.41 MeV Electron Injector Linac of the Mainz Microtron MAMI," Institut fur Kernphysik, Universitat Mainz, D-55099, Mainz Germany.
Bakhtyari, A. et al., "Horn Resonator Boosts Miniature Free-Electron Laser Power," Applied Physics Letters, May 12, 2003, pp. 3150-3152, vol. 82, No. 19, American Institute of Physics.
Bakhtyari, Dr. Arash, "Gain Mechanism in a Smith-Purcell MicroFEL," Abstract, Department of Physics and Astronomy, Dartmouth College.
Bhattacharjee, Sudeep et al., "Folded Waveguide Traveling-Wave Tube Sources for Terahertz Radiation." IEEE Transactions on Plasma Science, vol. 32. No. 3, Jun. 2004, pp. 1002-1014.
Booske, J.H. et al., "Microfabricated TWTs as High Power, Wideband Sources of THz Radiation".
Brau, C.A. et al., "Gain and Coherent Radiation from a Smith-Purcell Free Electron Laser," Proceedings of the 2004 FEL Conference, pp. 278-281.
Brownell, J.H. et al., "Improved µFEL Performance with Novel Resonator," Jan. 7, 2005, from website: www.frascati.enea.it/thz-bridge/workshop/presentations/Wednesday/We-07-Brownell.ppt.
Brownell, J.H. et al., "The Angular Distribution of the Power Produced by Smith-Purcell Radiation," J. Phys. D: Appl. Phys. 1997, pp. 2478-2481, vol. 30, IOP Publishing Ltd., United Kingdom.
Chuang, S.L. et al., "Enhancement of Smith-Purcell Radiation from a Grating with Surface-Plasmon Excitation," Journal of the Optical Society of America, Jun. 1984, pp. 672-676, vol. 1 No. 6, Optical Society of America.
Chuang, S.L. et al., "Smith-Purcell Radiation from a Charge Moving Above a Penetrable Grating," IEEE MTT-S Digest, 1983, pp. 405-406, IEEE.
Corcoran, Elizabeth, "Ride the Light," Forbes Magazine, Apr. 11, 2005, pp. 68-70.
Far-IR, Sub-MM & MM Detector Technology Workshop list of manuscripts, session 6 2002.
Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42 No. 5, H.W. Wilson Company, pp. 584-597.
Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.
Gallerano, G.P. et al., "Overview of Terahertz Radiation Sources," Proceedings of the 2004 FEL Conference, pp. 216-221.
Goldstein, M. et al., "Demonstration of a Micro Far-Infrared Smith-Purcell Emitter," Applied Physics Letters, Jul. 28, 1997, pp. 452-454, vol. 71 No. 4, American Institute of Physics.
Gover, A. et al., "Angular Radiation Pattern of Smith-Purcell Radiation," Journal of the Optical Society of America, Oct. 1984, pp. 723-728, vol. 1 No. 5, Optical Society of America.

Grishin, Yu. A. et al., "Pulsed Orotron—A New Microwave Source for Submillimeter Pulse High-Field Electron Paramagnetic Resonance Spectroscopy," Review of Scientific Instruments, Sep. 2004, pp. 2926-2936, vol. 75 No. 9, American Institute of Physics.

Ishizuka, H. et al., "Smith-Purcell Experiment Utilizing a Field-Emitter Array Cathode: Measurements of Radiation," Nuclear Instruments and Methods in Physics Research, 2001, pp. 593-598, A 475, Elsevier Science B.V.

Ishizuka, H. et al., "Smith-Purcell Radiation Experiment Using a Field-Emission Array Cathode," Nuclear Instruments and Methods in Physics Research, 2000, pp. 276-280, A 445, Elsevier Science B.V.

Ives, Lawrence et al., "Development of Backward Wave Oscillators for Terahertz Applications," Terahertz for Military and Security Applications, Proceedings of SPIE vol. 5070 (2003), pp. 71-82.

Ives, R. Lawrence, "IVEC Summary, Session 2, Sources I" 2002.

Jonietz, Erika, "Nano Antenna Gold nanospheres show path to all-optical computing," Technology Review, Dec. 2005/Jan. 2006, p. 32.

Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA Nov 1995 pp.117-121.

Joo, Youngcheol et al., "Fabrication of Monolithic Microchannels for IC Chip Cooling," 1995, Mechanical, Aerospace and Nuclear Engineering Department, University of California at Los Angeles.

Jung, K.B. et al., "Patterning of Cu, Co, Fe, and Ag for magnetic nanostructures," J. Vac. Sci. Technol. A 15(3), May/Jun. 1997, pp. 1780-1784.

Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.

Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.

Kim, Shang Hoon, "Quantum Mechanical Theory of Free-Electron Two-Quantum Stark Emission Driven by Transverse Motion," Journal of the Physical Society of Japan, Aug. 1993, vol. 62 No. 8, pp. 2528-2532.

Korbly, S.E. et al., "Progress on a Smith-Purcell Radiation Bunch Length Diagnostic," Plasma Science and Fusion Center, MIT, Cambridge, MA.

Kormann, T. et al., "A Photoelectron Source for the Study of Smith-Purcell Radiation".

Kube, G. et al., "Observation of Optical Smith-Purcell Radiation at an Electron Beam Energy of 855 MeV," Physical Review E, May 8, 2002, vol. 65, The American Physical Society, pp. 056501-1-056501-15.

Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.

Manohara, Harish et al., "Field Emission Testing of Carbon Nanotubes for THz Frequency Vacuum Microtube Sources." Abstract. Dec. 2003. from SPIEWeb.

Manohara, Harish M. et al., "Design and Fabrication of a THz Nanoklystron".

Manohara, Harish M. et al., "Design and Fabrication of a THz Nanoklystron" (www.sofia.usra.edu/det_workshop/ posters/session 3/3-43manohara_poster.pdf), PowerPoint Presentation.

McDaniel, James C. et al., "Smith-Purcell Radiation in the High Conductivity and Plasma Frequency Limits," Applied Optics, Nov. 15, 1989, pp. 4924-4929, vol. 28 No. 22, Optical Society of America.

Meyer, Stephan, "Far IR, Sub-MM & MM Detector Technology Workshop Summary," Oct. 2002. (may date the Manohara documents).

Mokhoff, Nicolas, "Optical-speed light detector promises fast space talk," EETimes Online, Mar. 20, 2006, from website: www.eetimes.com/showArticle.jhtml?articleID=183701047.

Nguyen, Phucanh et al., "Novel technique to pattern silver using CF4 and CF4/O2 glow discharges," J.Vac. Sci. Technol. B 19(1), Jan./Feb. 2001, American Vacuum Society, pp. 158-165.

Nguyen, Phucanh et al., "Reactive ion etch of patterned and blanket silver thin films in Cl2/O2 and O2 glow discharges," J. Vac. Sci, Technol. B. 17 (5), Sep./Oct. 1999, American Vacuum Society, pp. 2204-2209.

Ohtaka, Kazuo, "Smith-Purcell Radiation from Metallic and Dielectric Photonic Crystals," Center for Frontier Science, pp. 272-273, Chiba University, 1-33 Yayoi, Inage-ku, Chiba-shi, Japan.

Phototonics Research, "Surface-Plasmon-Enhanced Random Laser Demonstrated," Phototonics Spectra, Feb. 2005, pp. 112-113.

Platt, C.L. et al., "A New Resonator Design for Smith-Purcell Free Electron Lasers," 6Q19, p. 296.

Potylitsin, A.P., "Resonant Diffraction Radiation and Smith-Purcell Effect," (Abstract), arXiv: physics/9803043 v2 Apr. 13, 1998.

Potylitsyn, A.P., "Resonant Diffraction Radiation and Smith-Purcell Effect," Physics Letters A, Feb. 2, 1998, pp. 112-116, A 238, Elsevier Science B.V.

S. Hoogland et al., "A solution-processed 1.53 µm quantum dot laser with temperature-invariant emission wavelength," Optics Express, vol. 14, No. 8, Apr. 17, 2006, pp. 3273-3281.

Sartori, Gabriele, "CMOS Photonics Platform," Luxtera, Inc., Nov. 2005, 19 pages.

Savilov, Andrey V., "Stimulated Wave Scattering in the Smith-Purcell FEL," IEEE Transactions on Plasma Science, Oct. 2001, pp. 820-823, vol. 29 No. 5, IEEE.

Schachter, Levi et al., "Smith-Purcell Oscillator in an Exponential Gain Regime," Journal of Applied Physics, Apr. 15, 1989, pp. 3267-3269, vol. 65 No. 8, American Institute of Physics.

Schachter, Levi, "Influence of the Guiding Magnetic Field on the Performance of a Smith-Purcell Amplifier Operating in the Weak Compton Regime," Journal of the Optical Society of America, May 1990, pp. 873-876, vol. 7 No. 5, Optical Society of America.

Schachter, Levi, "The Influence of the Guided Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.

Shih, I. et al., "Experimental Investigations of Smith-Purcell Radiation," Journal of the Optical Society of America, Mar. 1990, pp. 351-356, vol. 7, No. 3, Optical Society of America.

Shih, I. et al., "Measurements of Smith-Purcell Radiation," Journal of the Optical Society of America, Mar. 1990, pp. 345-350, vol. 7 No. 3, Optical Society of America.

Swartz, J.C. et al., "THz-FIR Grating Coupled Radiation Source," Plasma Science, 1998. 1D02, p. 126.

Temkin, Richard, "Scanning with Ease Through the Far Infrared," Science, New Series, May 8, 1998, p. 854, vol. 280, No. 5365, American Association for the Advancement of Science.

Walsh, J.E., et al., 1999. From website: http://www.ieee.org/organizations/pubs/newsletters/leos/feb99/hot2.htm.

Wentworth, Stuart M. et al., "Far-Infrared Composite Microbolometers," IEEE MTT-S Digest, 1990, pp. 1309-1310.

Yamamoto, N. et al., "Photon Emission From Silver Particles Induced by a High-Energy Electron Beam," Physical Review B, Nov. 6, 2001, pp. 205419-1-205419-9, vol. 64, The American Physical Society.

Yokoo, K. et al., "Smith-Purcell Radiation at Optical Wavelength Using a Field-Emitter Array," Technical Digest of IVMC, 2003, pp. 77-78.

Zeng, Yuxiao et al., "Processing and encapsulation of silver patterns by using reactive ion etch and ammonia anneal," Materials Chemistry and Physics 66, 2000, pp. 77-82.

Search Report and Written Opinion mailed Aug. 24, 2007 in PCT Appln. No. PCT/US2006/022768.

Search Report and Written Opinion mailed Aug. 31, 2007 in PCT Appln. No. PCT/US2006/022680.

Search Report and Written Opinion mailed Jul. 16, 2007 in PCT Appln. No. PCT/US2006/022774.

Search Report and Written Opinion mailed Jul. 20, 2007 in PCT Appln. No. PCT/US2006/024216.

Search Report and Written Opinion mailed Jul. 26, 2007 in PCT Appln. No. PCT/US2006/022776.

Search Report and Written Opinion mailed Jun. 20, 2007 in PCT Appln. No. PCT/US2006/022779.

Search Report and Written Opinion mailed Sep. 12, 2007 in PCT Appln. No. PCT/US2006/022767.
Search Report and Written Opinion mailed Sep. 13, 2007 in PCT Appln. No. PCT/US2006/024217.
Search Report and Written Opinion mailed Sep. 17, 2007 in PCT Appln. No. PCT/US2006/022787.
Search Report and Written Opinion mailed Sep. 5, 2007 in PCT Appln. No. PCT/US2006/027428.
Search Report and Written Opinion mailed Sep. 17, 2007 in PCT Appln. No. PCT/US2006/022689.
International Search Report and Written Opinion mailed Nov. 23, 2007 in International Application No. PCT/US2006/022786.
Search Report and Written Opinion mailed Oct. 25, 2007 in PCT Appln. No. PCT/US2006/022687.
Search Report and Written Opinion mailed Oct. 26, 2007 in PCT Appln. No. PCT/US2006/022675.
Search Report and Written Opinion mailed Sep. 21, 2007 in PCT Appln. No. PCT/US2006/022688.
Search Report and Written Opinion mailed Sep. 25, 2007 in PCT Appln. No. PCT/US2006/022681.
Search Report and Written Opinion mailed Sep. 26, 2007 in PCT Appln. No. PCT/US2006/024218.
"An Early History—Invention of the Klystron," http://varianinc.com/cgi-bin/advprint/print.cgi?cid=KLQNPPJJFJ, printed on Dec. 26, 2008.
"An Early History—The Founding of Varian Associates," http://varianinc.com/cgi-bin/advprint/print.cgi?cid=KLQNPPJJFJ, printed on Dec. 26, 2008.
"Chapter 3 E-Ray Tube," http://compepid.tuskegee.edu/syllabi/clinical/small/radiology/chapter..., printed from tuskegee.edu on Dec. 29, 2008.
"Diagnostic imaging modalities—Ionizing vs non-ionizing radiation," http://info.med.yale.edu/intmed/cardio/imaging/techniques/ionizing_v..., printed from Yale University School of Medicine on Dec. 29, 2008.
"Klystron Amplifier," http://www.radartutorial.eu/08.transmitters/tx12.en.html, printed on Dec. 26, 2008.
"Klystron is a Micowave Generator," http://www2.slac.stanford.edu/vvc/accelerators/klystron.html, printed on Dec. 26, 2008.
"Klystron," http:en.wikipedia.org/wiki/Klystron, printed on Dec. 26, 2008.
"Making E-rays," http://www.fnrfscience.cmu.ac.th/theory/radiation/xray-basics.html, printed on Dec. 29, 2008.
"Microwave Tubes," http://www.tpub.com/neets/book11/45b.htm, printed on Dec. 26, 2008.
"Notice of Allowability" mailed on Jan. 17, 2008 in U.S. Appl. No. 11/418,082, filed May 5, 2006.
"The Reflex Klystron," http://www.fnrfscience.cmu.ac.th/theory/microwave/microwave%2, printed from Fast Netoron Research Facility on Dec. 26, 2008.
"X-ray tube," http://www.answers.com/topic/x-ray-tube, printed on Dec. 29, 2008.
Neo et al., "Smith-Purcell Radiation from Ultraviolet to Infrared Using a Si-field Emitter" Vacuum Electronics Conference, 2007, IVEC '07, IEEE International May 2007.
Saraph, Girish P. et al., "Design of a Single-Stage Depressed Collector for High-Power, Pulsed Gyroklystrom Amplifiers," IEEE Transactions on Electron Devices, vol. 45, No. 4, Apr. 1998, pp. 986-990.
Search Report and Writen Opinion mailed Jul. 14, 2008 in PCT Appln. No. PCT/US2006/022773.
Search Report and Written Opinion mailed Apr. 23, 2008 in PCT Appln. No. PCT/US2006/022678.
Search Report and Written Opinion mailed Apr. 3, 2008 in PCT Appln. No. PCT/US2006/027429.
Search Report and Written Opinion mailed Aug. 19, 2008 in PCT Appln. No. PCT/US2007/008363.
Search Report and Written Opinion mailed Jul. 16, 2008 in PCT Appln. No. PCT/US2006/022766.
Search Report and Written Opinion mailed Jul. 28, 2008 in PCT Appln. No. PCT/US2006/022782.
Search Report and Written Opinion mailed Jul. 3, 2008 in PCT Appln. No. PCT/US2006/022690.
Search Report and Written Opinion mailed Jul. 3, 2008 in PCT Appln. No. PCT/US2006/022778.
Search Report and Written Opinion mailed Jul. 7, 2008 in PCT Appln. No. PCT/US2006/022686.
Search Report and Written Opinion mailed Jul. 7, 2008 in PCT Appln. No. PCT/US2006/022785.
Search Report and Written Opinion mailed Jun. 18, 2008 in PCT Appln. No. PCT/US2006/027430.
Search Report and Written Opinion mailed Jun. 3, 2008 in PCT Appln. No. PCT/US2006/022783.
Search Report and Written Opinion mailed Mar. 24, 2008 in PCT Appln. No. PCT/US2006/022677.
Search Report and Written Opinion mailed Mar. 24, 2008 in PCT Appln. No. PCT/US2006/022784.
Search Report and Written Opinion mailed May 2, 2008 in PCT Appln. No. PCT/US2006/023280.
Search Report and Written Opinion mailed Sep. 2, 2008 in PCT Appln. No. PCT/US2006/022769.
Search Report and Written Opinion mailed Sep. 26, 2008 in PCT Appln. No. PCT/US2007/00053.
Search Report and Written Opinion mailed Sep. 3, 2008 in PCT Appln. No. PCT/US2006/022770.
Brau et al., "Tribute to John E Walsh", Nuclear Instruments and Methods in Physics Research Section A. Accelerators, Spectrometers, Detectors and Associated Equipment, vol. 475, Issues 1-3, Dec. 21, 2001, pp. xiii-xiv.
Kapp, et al., "Modification of a scanning electron microscope to produce Smith—Purcell radiation", Rev. Sci. Instrum. 75, 4732 (2004).
Scherer et al. "Photonic Crystals for Confining, Guiding, and Emitting Light", IEEE Transactions on Nanotechnology, vol. 1, No. 1, Mar. 2002, pp. 4-11.
U.S. Appl. No. 11/203,407—Jul. 17, 2009 PTO Office Action.
U.S. Appl. No. 11/418,089—Jul. 15, 2009 PTO Office Action.
U.S. Appl. No. 11/418,097—Sep. 16, 2009 PTO Office Action.
U.S. Appl. No. 11/418,123—Aug. 11, 2009 PTO Office Action.
U.S. Appl. No. 11/418,365—Jul. 23, 2009 PTO Office Action.
U.S. Appl. No. 11/441,240—Aug. 31, 2009 PTO Office Action.
Urata et al., "Superradiant Smith-Purcell Emission", Phys. Rev. Lett. 80, 516-519 (1998).
Mar. 6, 2009 Response to PTO Office Action of Sep. 16, 2008 in U.S. Appl. No. 11/418,085.
Mar. 17, 2008 PTO Office Action in U.S. Appl. No. 11/353,208.
Mar. 19, 2009 PTO Office Action in U.S. Appl. No. 11/411,120.
Mar. 24, 2006 PTO Office Action in U.S. Appl. No. 10/917,511.
Mar. 25, 2008 PTO Office Action in U.S. Appl. No. 11/411,131.
Mar. 26, 2009 Response to PTO Office Action of Sep. 26, 2008 in U.S. Appl. No. 11/410,905.
Mar. 31, 2008 PTO Office Action in U.S. Appl. No. 11/418,315.
Apr. 8, 2008 PTO Office Action in U.S. Appl. No. 11/325,571.
Apr. 11, 2008 PTO Office Action in U.S. Appl. No. 11/418,079.
Apr. 17, 2008 Response to PTO Office Action of Dec. 20, 2007 in U.S. Appl. No. 11/418,087.
Apr. 19, 2007 Response to PTO Office Action of Jan. 17, 2007 in U.S. Appl. No. 11/418,082.
May 5, 2008 Response to PTO Office Action of Nov. 5, 2007 in U.S. Appl. No. 11/418,084.
May 10, 2005 PTO Office Action in U.S. Appl. No. 10/917,511.
May 21, 2007 PTO Office Action in U.S. Appl. No. 11/418,087.
May 26, 2006 Response to PTO Office Action of Mar. 24, 2006 in U.S. Appl. No. 10/917,511.
Jun. 11, 2008 PTO Office Action in U.S. Appl. No. 11/325,534.
Jun. 16, 2008 Response to PTO Office Action of Dec. 14, 2007 in U.S. Appl. No. 11/418,264.
Jun. 20, 2008 PTO Office Action in U.S. Appl. No. 11/418,083.
Jun. 20, 2008 Response to PTO Office Action of Mar. 25, 2008 in U.S. Appl. No. 11/411,131.
Jul. 1, 2008 PTO Office Action in U.S. Appl. No. 11/418,244.
Aug. 10, 2007 PTO Office Action in U.S. Appl. No. 11/418,085.
Aug. 12, 2008 Response to PTO Office Action of Feb. 12, 2008 in U.S. Appl. No. 11/418,085.
Aug. 14, 2006 PTO Office Action in U.S. Appl. No. 10/917,511.
Aug. 19, 2008 PTO Office Action in U.S. Appl. No. 11/418,084.

Sep. 1, 2006 Response to PTO Office Action of Aug. 14, 2006 in U.S. Appl. No. 10/917,511.
Sep. 12, 2005 Response to PTO Office Action of May 10, 2005 in U.S. Appl. No. 10/917,511.
Sep. 14, 2007 PTO Office Action in U.S. Appl. No. 11/411,131.
Sep. 15, 2008 Response to PTO Office Action of Mar. 17, 2008 in U.S. Appl. No. 11/353,208.
Sep. 16, 2008 PTO Office Action in U.S. Appl. No. 11/418,085.
Sep. 26, 2008 PTO Office Action in U.S. Appl. No. 11/410,905.
Oct. 7, 2008 Response to PTO Office Action of Apr. 11, 2008 in U.S. Appl. No. 11/418,079.
Oct. 15, 2008 Response to PTO Office Action of Jun. 11, 2008 in U.S. Appl. No. 11/325,534.
Oct. 19, 2007 Response to PTO Office Action of May 21, 2007 in U.S. Appl. No. 11/418,087.
Nov. 5, 2007 PTO Office Action in U.S. Appl. No. 11/418,084.
Nov. 13, 2007 Response to PTO Office Action of Aug. 10, 2007 in U.S. Appl. No. 11/418,085.
Nov. 25, 2008 Response to PTO Office Action of Jul. 1, 2008 in U.S. Appl. No. 11/418,244.
Dec. 4, 2006 PTO Office Action in U.S. Appl. No. 11/418,087.
Dec. 14, 2007 PTO Office Action in U.S. Appl. No. 11/418,264.
Dec. 14, 2007 Response to PTO Office Action of Sep. 14, 2007 in U.S. Appl. No. 11/411,131.
Dec. 18, 2008 Response to PTO Office Action of Jun. 20, 2008 in U.S. Appl. No. 11/418,083.
Dec. 20, 2007 PTO Office Action in U.S. Appl. No. 11/418,087.
Dec. 24, 2008 PTO Office Action in U.S. Appl. No. 11/353,208.
European Search Report mailed Mar. 3, 2009 in European Application No. 06852028.7.
Search Report and Written Opinion mailed Jul. 28, 2008 in PCT Appln. No. PCT/US2006/022782.
Search Report and Written Opinion mailed Jul. 3, 2008 in PCT Appln. No. PCT/US2006/022690.
Search Report and Written Opinion mailed Jul. 3, 2008 in PCT Appln. No. PCT/US2006/022778.
Search Report and Written Opinion mailed Jul. 7, 2008 in PCT Appln. No. PCT/US2006/022686.
Search Report and Written Opinion mailed Jul. 7, 2008 in PCT Appln. No. PCT/US2006/022785.
U.S. Appl. No. 11/203,407—Nov. 13, 2008 PTO Office Action.
U.S. Appl. No. 11/238,991—Dec. 6, 2006 PTO Office Action.
U.S. Appl. No. 11/238,991—Jun. 6, 2006 Response to PTO Office Action of Dec. 6, 2006.
U.S. Appl. No. 11/238,991—Sep. 10, 2007 PTO Office Action.
U.S. Appl. No. 11/238,991—Mar. 6, 2008 Response to PTO Office Action of Sep. 10, 2007.
U.S. Appl. No. 11/238,991—Jun. 27, 2008 PTO Office Action.
U.S. Appl. No. 11/238,991—Dec. 29, 2008 Response to PTO Office Action of Jun. 27, 2008.
U.S. Appl. No. 11/238,991—Mar. 24, 2009 PTO Office Action.
U.S. Appl. No. 11/243,477—Apr. 25, 2008 PTO Office Action.
U.S. Appl. No. 11/243,477—Oct. 24, 2008 Response to PTO Office Action of Apr. 25, 2008.
U.S. Appl. No. 11/243,477—Jan. 7, 2009 PTO Office Action.
U.S. Appl. No. 11/325,448—Jun. 16, 2008 PTO Office Action.
U.S. Appl. No. 11/325,448—Dec. 16, 2008 Response to PTO Office Action of Jun. 16, 2008.
U.S. Appl. No. 11/353,208—Jan. 15, 2008 PTO Office Action.
U.S. Appl. No. 11/353,208—Dec. 30, 2008 Response to PTO Office Action of Dec. 24, 2008.
U.S. Appl. No. 11/400,280—Oct. 16, 2008 PTO Office Action.
U.S. Appl. No. 11/400,280—Oct. 24, 2008 Response to PTO Office Action of Oct. 16, 2008.
U.S. Appl. No. 11/410,924—Mar. 6, 2009 PTO Office Action.
U.S. Appl. No. 11/411,129—Jan. 16, 2009 Office Action.
U.S. Appl. No. 11/411,130—May, 1, 2008 PTO Office Action.
U.S. Appl. No. 11/411,130—Oct 29, 2008 Response to PTO Office Action of May 1, 2008.
U.S. Appl. No. 11/417,129—Jul. 11, 2007 PTO Office Action.
U.S. Appl. No. 11/417,129—Dec. 17, 2007 Response to PTO Office Action of Jul. 11, 2007.
U.S. Appl. No. 11/417,129—Dec. 20, 2007 Response to PTO Office Action of Jul. 11, 2007.
U.S. Appl. No. 11/417,129—Apr. 17, 2008 PTO Office Action.
U.S. Appl. No. 11/417,129—Jun. 19, 2008 Response to PTO Office Action of Apr. 17, 2008.
U.S. Appl. No. 11/418,079—Feb. 12, 2009 PTO Office Action.
U.S. Appl. No. 11/418,080—Mar. 18, 2009 PTO Office Action.
U.S. Appl. No. 11/418,082—Jan. 17, 2007 PTO Office Action.
U.S. Appl. No. 11/418,084—Feb. 19, 2009 Response to PTO Office Action of Aug. 19, 2008.
U.S. Appl. No. 11/418,085—Feb. 12, 2008 PTO Office Action.
U.S. Appl. No. 11/418,087—Dec. 29, 2006 Response to PTO Office Action of Dec. 4, 2006.
U.S. Appl. No. 11/418,087—Feb. 15, 2007 PTO Office Action.
U.S. Appl. No. 11/418,087—Mar. 6, 2007 Response to PTO Office Action of Feb. 15, 2007.
U.S. Appl. No. 11/418,088—Jun. 9, 2008 PTO Office Action.
U.S. Appl. No. 11/418,088—Dec. 8, 2008 Response to PTO Office Action of Jun. 9, 2008.
U.S. Appl. No. 11/418,089—Mar. 21, 2008 PTO Office Action.
U.S. Appl. No. 11/418,089—Jun. 23, 2008 Response to PTO Office Action of Mar 21, 2008.
U.S. Appl. No. 11/418,089—Sep. 30, 2008 PTO Office Action.
U.S. Appl. No. 11/418,089—Mar. 30, 2009 Response to PTO Office Action of Sep. 30, 2008.
U.S. Appl. No. 11/418,091—Jul. 30, 2007 PTO Office Action.
U.S. Appl. No. 11/418,091—Nov. 27, 2007 Response to PTO Office Action of Jul. 30, 2007.
U.S. Appl. No. 11/418,091—Feb. 26, 2008 PTO Office Action.
U.S. Appl. No. 11/418,097—Jun. 2, 2008 PTO Office Action.
U.S. Appl. No. 11/418,097—Dec. 2, 2008 Response to PTO Office Action of Jun. 2, 2008.
U.S. Appl. No. 11/418,097—Feb. 18, 2009 PTO Office Action.
U.S. Appl. No. 11/418,099—Jun. 23, 2008 PTO Office Action.
U.S. Appl. No. 11/418,099—Dec. 23, 2008 Response to PTO Office Action of Jun. 23, 2008.
U.S. Appl. No. 11/418,123—Apr. 25, 2008 PTO Office Action.
U.S. Appl. No. 11/418,123—Oct. 27, 2008 Response to PTO Office Action of Apr. 25, 2008.
U.S. Appl. No. 11/418,123—Jan. 26, 2009 PTO Office Action.
U.S. Appl. No. 11/418,124—Oct. 1, 2008 PTO Office Action.
U.S. Appl. No. 11/418,124—Feb. 2, 2009 Response to PTO Office Action of Oct. 1, 2008.
U.S. Appl. No. 11/418,124—Mar. 13, 2009 PTO Office Action.
U.S. Appl. No. 11/418,126—Oct. 12, 2006 PTO Office Action.
U.S. Appl. No. 11/418,126—Feb. 12, 2007 Response to PTO Office Action of Oct. 12, 2006 (Redacted).
U.S. Appl. No. 11/418,126—Jun. 6, 2007 PTO Office Action.
U.S. Appl. No. 11/418,126—Aug. 6, 2007 Response to PTO Office Action of Jun. 6, 2007.
U.S. Appl. No. 11/418,126—Nov. 2, 2007 PTO Office Action.
U.S. Appl. No. 11/418,126—Feb. 22, 2008 Response to PTO Office Action of Nov. 2, 2007.
U.S. Appl. No. 11/418,126—Jun. 10, 2008 PTO Office Action.
U.S. Appl. No. 11/418,127—Apr. 2, 2009 Office Action.
U.S. Appl. No. 11/418,128—Dec. 16, 2008 PTO Office Action.
U.S. Appl. No. 11/418,128—Dec. 31, 2008 Response to PTO Office Action of Dec. 16, 2008.
U.S. Appl. No. 11/418,128—Feb. 17, 2009 PTO Office Action.
U.S. Appl. No. 11/418,129—Dec. 16, 2008 Office Action.
U.S. Appl. No. 11/418,129—Dec. 31, 2008 Response to PTO Office Action of Dec. 16, 2008.
U.S. Appl. No. 11/418,263—Sep. 24, 2008 PTO Office Action.
U.S. Appl. No. 11/418,263—Dec. 24, 2008 Response to PTO Office Action of Sep. 24, 2008.
U.S. Appl. No. 11/418,263—Mar. 9, 2009 PTO Office Action.
U.S. Appl. No. 11/418,318—Mar. 31, 2009 PTO Office Action.
U.S. Appl. No. 11/441,219—Jan. 7, 2009 PTO Office Action.
U.S. Appl. No. 11/522,929—Oct. 22, 2007 PTO Office Action.
U.S. Appl. No. 11/522,929—Feb. 21, 2008 Response to PTO Office Action of Oct. 22, 2007.
U.S. Appl. No. 11/641,678—Jul. 22, 2008 PTO Office Action.

U.S. Appl. No. 11/641,678—Jan. 22, 2009 Response to Office Action of Jul. 22, 2008.

U.S. Appl. No. 11/711,000—Mar. 6, 2009 PTO Office Action.

U.S. Appl. No. 11/716,552—Feb. 12, 2009 Response to PTO Office Action of Feb. 9, 2009.

U.S. Appl. No. 11/716,552—Jul. 3, 2008 PTO Office Action.

"Notice of Allowability" mailed on Jul. 2, 2009 in U.S. Appl. No. 11/410,905, filed Apr. 26, 2006.

"Notice of Allowability" mailed on Jun. 30, 2009 in U.S. Appl. No. 11/418,084, filed May 5, 2006.

B. B Loechel et al., "Fabrication of Magnetic Microstructures by Using Thick Layer Resists", Microelectronics Eng., vol. 21, pp. 463-466 (1993).

Magellan 8500 Scanner Product Reference Guide, PSC Inc., 2004, pp. 6-27—F18.

Magellan 9500 with SmartSentry Quick Reference Guide, PSC Inc., 2004.

Response to Non-Final Office Action submitted May 13, 2009 in U.S. Appl. No. 11/203,407.

U.S. Appl. No. 11/238,991—May 11, 2009 PTO Office Action.

U.S. Appl. No. 11/350,812—Apr. 17, 2009 Office Action.

U.S. Appl. No. 11/411,130—Jun. 23, 2009 PTO Office Action.

U.S. Appl. No. 11/418,096—Jun. 23, 2009 PTO Office Action.

U.S. Appl. No. 11/433,486—Jun. 19, 2009 PTO Office Action.

* cited by examiner

ELECTRO-OPTICAL SWITCHING SYSTEM AND METHOD

CROSS-REFERENCE TO CO-PENDING APPLICATIONS

The present invention is related to the following co-pending U.S. Patent applications: (1) U.S. patent application Ser. No. 11/238,991, entitled "Ultra-Small Resonating Charged Particle Beam Modulator," and filed Sep. 30, 2005; (2) U.S. patent application Ser. No. 10/917,511, filed on Aug. 13, 2004, entitled "Patterning Thin Metal Film by Dry Reactive Ion Etching,"; (3) U.S. application Ser. No. 11/203,407, filed on Aug. 15, 2005, entitled "Method Of Patterning Ultra-Small Structures"; (4) U.S. application Ser. No. 11/243,476, entitled "Structures And Methods For Coupling Energy From An Electromagnetic Wave," filed on Oct. 5, 2005; (5) U.S. application Ser. No. 11/243,477, entitled "Electron Beam Induced Resonance," filed on Oct. 5, 2005, (6) U.S. application Ser. No. 11/411,130, entitled "Charged Particle Acceleration Apparatus and Method," filed on Apr. 26, 2006, and (6) U.S. application Ser. No. 11/411,129, entitled "Micro Free Electron Laser (FEL)," filed on Apr. 26, 2006, all of which are commonly owned with the present application at the time of filing, and the entire contents of each of which are incorporated herein by reference.

BACKGROUND OF THE INVENTION

1. Field of the Invention

The present invention is directed to structures and methods of combining coherent electromagnetic radiation, and, in one embodiment, to structures and methods of combining coherent light using electrons in an electron beam and a set of resonant structures that resonate at a frequency higher than a microwave frequency.

2. Discussion of the Background

It is possible to emit a beam of charged particles according to a number of known techniques. Electron beams are currently being used in semiconductor lithography operations, such as in U.S. Pat. No. 6,936,981. The abstract of that patent also discloses the use of a "beam retarding system [that] generates a retarding electric potential about the electron beams to decrease the kinetic energy of the electron beams substantially near a substrate."

An alternate charged particle source includes an ion beam. One such ion beam is a focused ion beam (FIB) as disclosed in U.S. Pat. No. 6,900,447 which discloses a method and system for milling. That patent discloses that "The positively biased final lens focuses both the high energy ion beam and the relatively low energy electron beam by functioning as an acceleration lens for the electrons and as a deceleration lens for the ions." Col. 7, lines 23-27.

Free electron lasers are known. In at least one prior art free electron laser (FEL), very high velocity electrons and magnets are used to make the magnetic field oscillations appear to be very close together during radiation emission. However, the need for high velocity electrons is disadvantageous. U.S. Pat. No. 6,636,534 discloses a FEL and some of the background thereon.

SUMMARY OF THE INVENTION

It is an object of the present invention to combine coherent light using at least one optical switching element, where the coherent light is created by charged particles in a beam and a set of resonant structures that resonate at a frequency higher than a microwave frequency.

According to one aspect of the present invention, a series of electrically controllable light directing structures or waveguides are combined with a source of coherent light such that the coherent light can be optically switched. One such switch can be created using plural channels, where the level of influence on the light as it passes through the first and second channels controls whether light is transmitted out of the switch. In a first state, light passing through a first channel is delayed in relation to light passing through a second channel such that the light of the first and second channels are destructively combined. In a second state, light passing through a first channel is not delayed in relation to light passing through a second channel such that the light of the first and second channels are constructively combined. Electrical signals control the first and second states.

BRIEF DESCRIPTION OF THE DRAWINGS

For a more complete understanding of the present invention, and the advantages thereof, reference is now made to the following descriptions taken in conjunction with the accompanying drawings, in which.

DISCUSSION OF THE PREFERRED EMBODIMENTS

Figure 1:
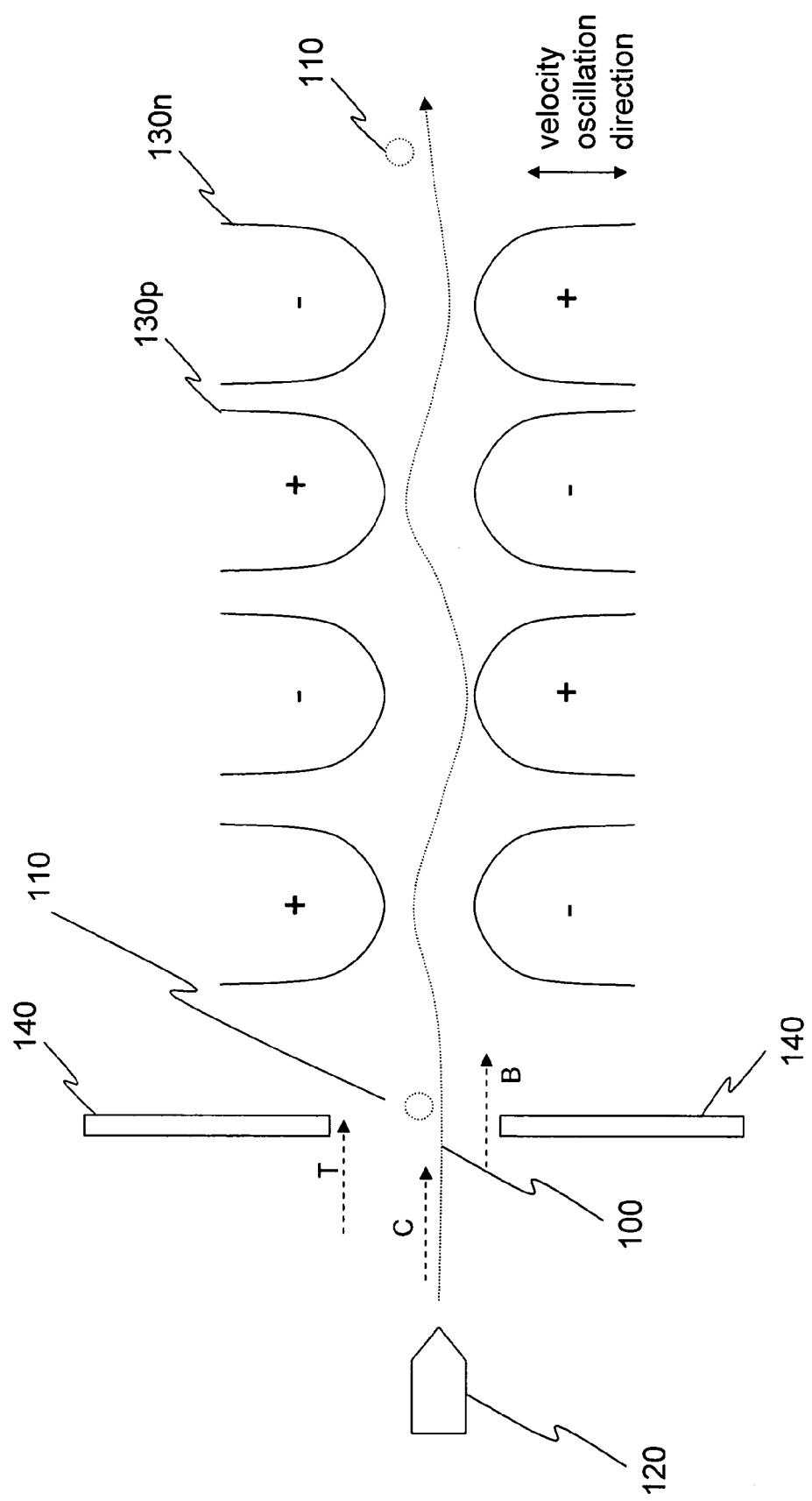
FIG. 1 is a top-view, high-level conceptual representation of a charged particle moving through a series of alternating electric fields according to a first embodiment of the present invention.

Turning now to the drawings, FIG. 1 is a high-level conceptual representation of a charged particle moving through a series of alternating electric fields according to a first embodiment of the present invention. As shown therein, a charged particle beam 100 including charged particles 110 (e.g., electrons) is generated from a charged particle source 120. The charged particle beam 100 can include ions (positive or negative), electrons, protons and the like. The beam may be produced by any source, including, e.g., without limitation an ion gun, a thermionic filament, a tungsten filament, a cathode, a planar vacuum triode, an electron-impact ionizer, a laser ionizer, a chemical ionizer, a thermal ionizer, an ion-impact ionizer.

As the beam 100 is projected, it passes between plural alternating electric fields 130p and 130n. As used herein, the phrase "positive electric field" 130p should be understood to mean an electric field with a more positive portion on the upper portion of the figure, and the phrase "negative electric field" 130n should be understood to mean an electric field with a more negative portion on the upper portion of the figure. In this first embodiment, the electric fields 130p and 130n alternate not only on the same side but across from each other as well. That is, each positive electric field 130p is surrounded by a negative electric field 130n on three sides. Likewise, each negative electric field 130n is surrounded by a positive field 130p on three sides. In the illustrated embodiment, the charged particles 110 are electrons which are attracted to the positive electric fields 130p and repelled by the negative electric fields 130n. The attraction of the charged particles 110 to their oppositely charged fields 130p or 130n accelerates the charged particles 110 transversely to their axial velocity.

The series of alternating fields creates an oscillating path in the directions of top to bottom of FIG. 1 and as indicated by the legend "velocity oscillation direction." In such a case, the velocity oscillation direction is generally perpendicular to the direction of motion of the beam 100.

The charged particle source 120 may also optionally include one or more electrically biased electrodes 140 (e.g., (a) grounding electrodes or (b) positively biased electrodes) which help to keep the charged particles (e.g., (a) electrons or negatively charged ions or (b) positively charged ions) on the desired path.

Figure 2:
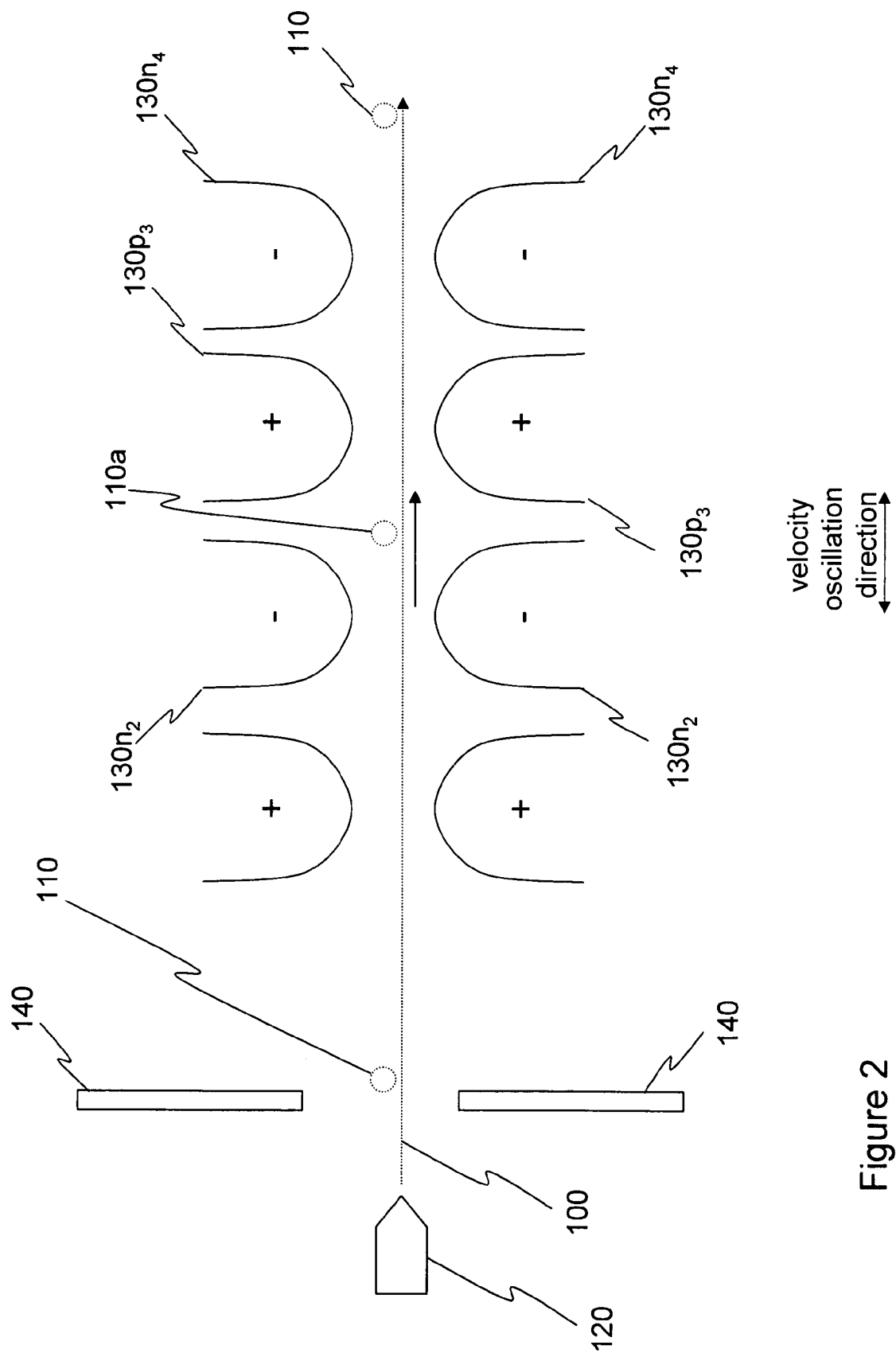
FIG. 2 is a top-view, high-level conceptual representation of a charged particle accelerating while being influenced by at least one field of a series of alternating electric fields according to a second embodiment of the present invention.
Figure 3:
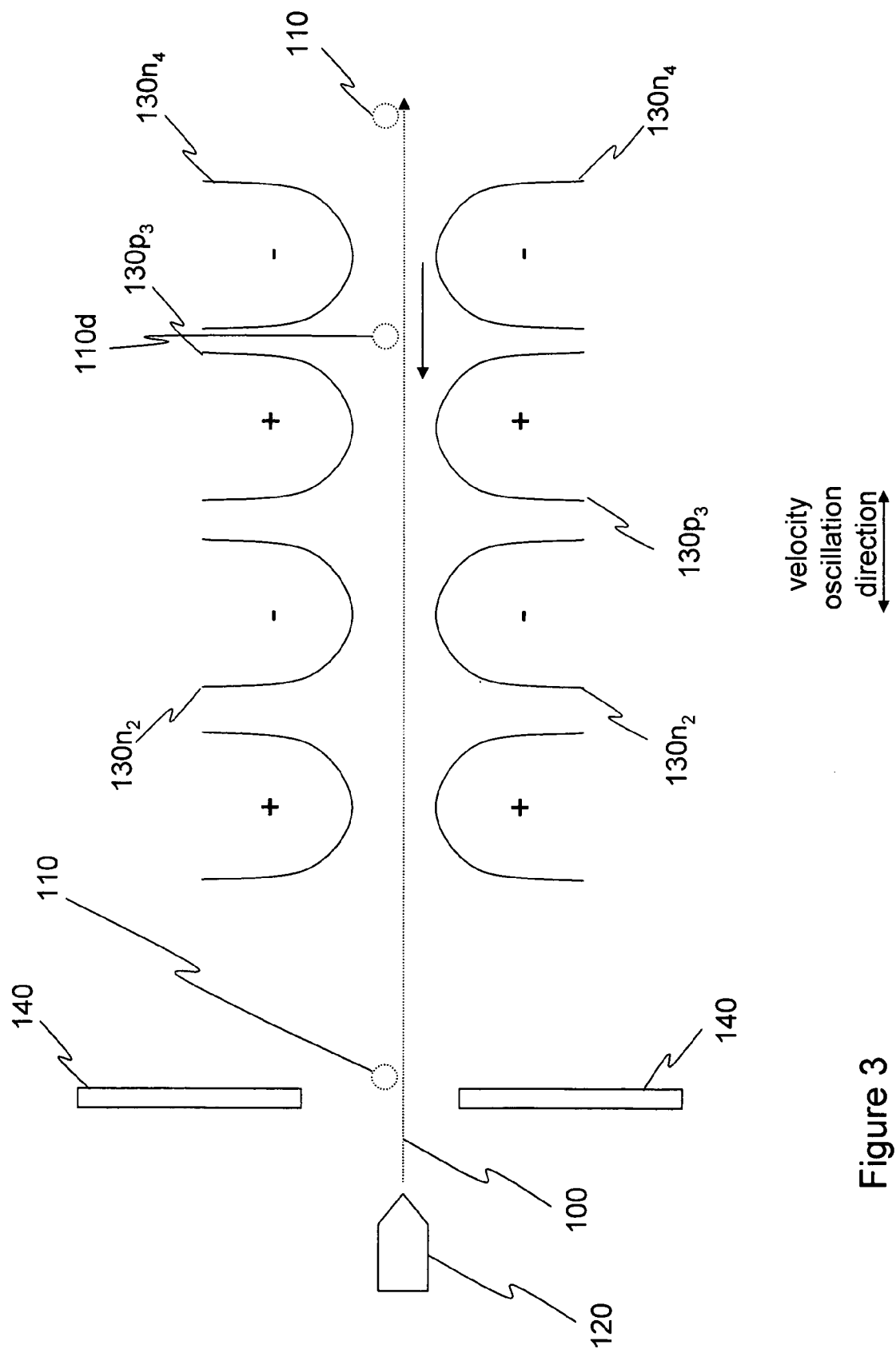
FIG. 3 is a top-view, high-level conceptual representation of a charged particle decelerating while being influenced by at least one field of a series of alternating electric fields according to a second embodiment of the present invention.

In the alternate embodiments illustrated in FIGS. 2 and 3, various elements from FIG. 1 have been repeated, and their reference numerals are repeated in FIGS. 2 and 3. However, the order of the electric fields 130p and 130n below the path of the charged particle beam 100 has been changed. In FIGS. 2 and 3, while the electric fields 130n and 130p are still alternating on the same side, they are now of opposing direction on opposite sides of the beam 100, allowing for no net force on the charged particles 110 perpendicular to the beam 100. There is, though, a force of oscillatory character acting on the charged particles 100 in the direction of the beam 100. Thus, in the case of an electron acting as a charged particle 110, the electron 110a in FIG. 2 is an accelerating electron that is being accelerated by being repelled from the negative fields 130n₂ while being attracted to the next positive fields 130p₃ in the direction of motion of the beam 100. (The direction of acceleration is shown below the accelerating electron 100a).

Conversely, as shown in FIG. 3, in the case of an electron acting as a charged particle 110, the electron 110d in FIG. 2 is a decelerating electron that is being decelerated (i.e., negatively accelerated) as it approaches the negative fields 130n₄ while still being attracted to the previous positive fields 130p₃. The direction of acceleration is shown below the decelerating electron 100d. Moreover, both FIGS. 2 and 3 include the legend "velocity oscillation direction" showing the direction of the velocity changes. In such cases, the velocity oscillation direction is generally parallel to the direction of motion of the beam 100. It should be understood, however, that the direction of the electron does not change, only that its velocity increases and decreases in the illustrated direction.

By varying the order and strength of the electric fields 130n and 130p, a variety of magnitudes of acceleration can be achieved allowing for attenuation of the motion of the charged particles 110. As should be understood from the disclosure, the strengths of adjacent electric fields, fields on the same side of the beam 100 and fields on opposite sides of the beam 100 need not be the same strength. Moreover, the strengths of the fields and the directions of the fields need not be fixed either but may instead vary with time. The fields 130n and 130p may even be created by applying a electromagnetic wave to a resonant structure, described in greater detail below.

The electric fields utilized by the present invention can be created by any known method which allows sufficiently fine-tuned control over the paths of the charged particles so that they stay within intended path boundaries.

According to one aspect of the present invention, the electric fields can be generated using at least one resonant structure where the resonant structure resonates at a frequency above a microwave frequency. Resonant structures include resonant structures shown in or constructed by the teachings of the above-identified co-pending applications. In particular, the structures and methods of U.S. application Ser. No. 11/243,477, entitled "Electron Beam Induced Resonance," filed on Oct. 5, 2005, can be utilized to create electric fields 130 for use in the present invention.

Figure 4:
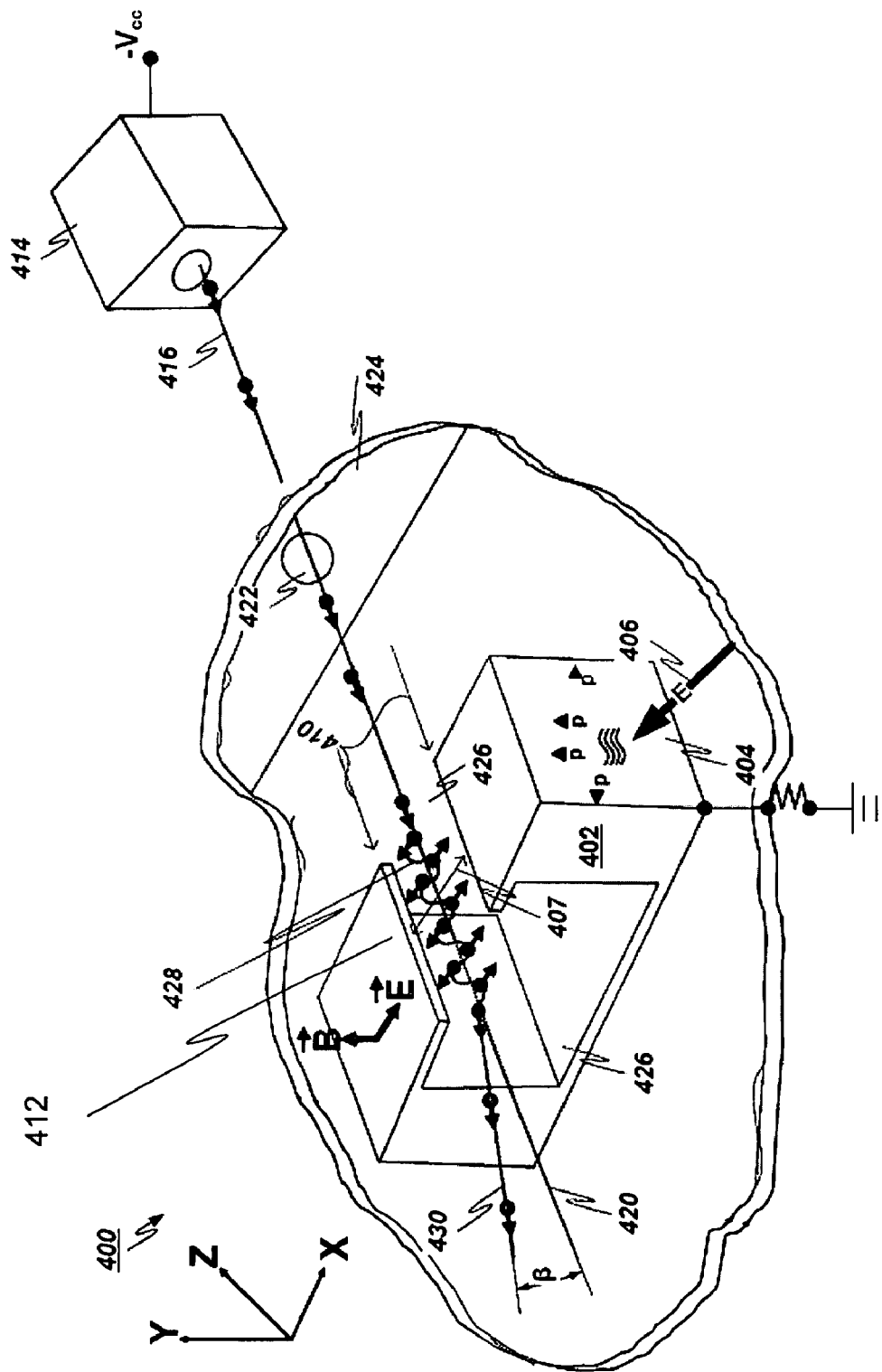
FIG. 4 is a perspective-view, high-level conceptual representation of a charged particle moving through a series of alternating electric fields produced by a resonant structure.

FIG. 4 is a perspective-view, high-level conceptual representation of a charged particle moving through a series of alternating electric fields produced by a resonant structure (RS) 402 (e.g., a microwave resonant structure or an optical resonant structure). An electromagnetic wave 406 (also denoted E) incident to a surface 404 of the RS 402 transfers energy to the RS 402, which generates a varying field 407. In the exemplary embodiment shown in FIG. 4, a gap 410 formed by ledge portions 412 can act as an intensifier. The varying field 407 is shown across the gap 410 with the electric and magnetic field components (denoted $\vec{E}$ and $\vec{B}$) generally along the X and Y axes of the coordinate system, respectively. Since a portion of the varying field can be intensified across the gap 410, the ledge portions 412 can be sized during fabrication to provide a particular magnitude or wavelength of the varying field 407.

A charged particle source 414 (such as the source 120 described with reference to FIGS. 1-3) targets a beam 416 (such as a beam 100) of charged particles (e.g., electrons) along a straight path 420 through an opening 422 on a sidewall 424 of the device 400. The charged particles travel through a space 426 within the gap 410. Upon interaction with the varying field 426, the charged particles are shown angularly modulated from the straight path 420. Generally, the charged particles travel on an oscillating path 428 within the gap 410. After passing through the gap 410, the charged particles are angularly modulated on a new path 430. An angle β illustrates the deviation between the new path 430 and the straight path 420.

As would be appreciated by one of ordinary skill in the art, a number of resonant structures 402 can be repeated to provide additional electric fields for influencing the charged particles of the beam 416. Alternatively, the direction of the oscillation can be changed by turning the resonant structure 402 on its side onto surface 404.

Figure 5A:
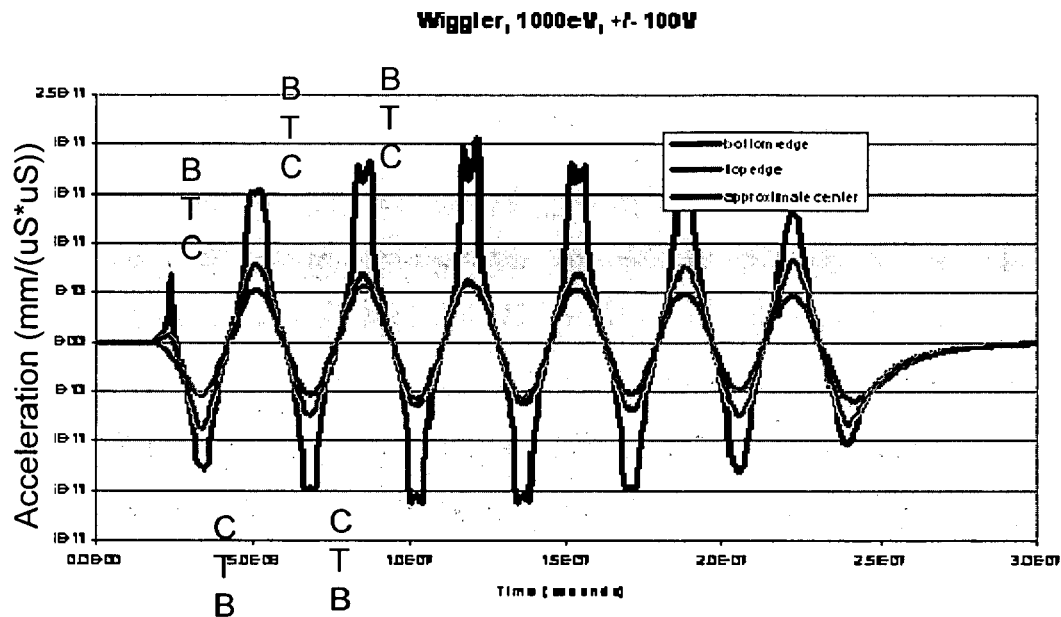
FIGS. 5A-5C are the outputs of a computer simulation showing trajectories and accelerations of model devices using potentials of +/−100V, +/−200V and +/−300V, respectively.
Figure 5B:
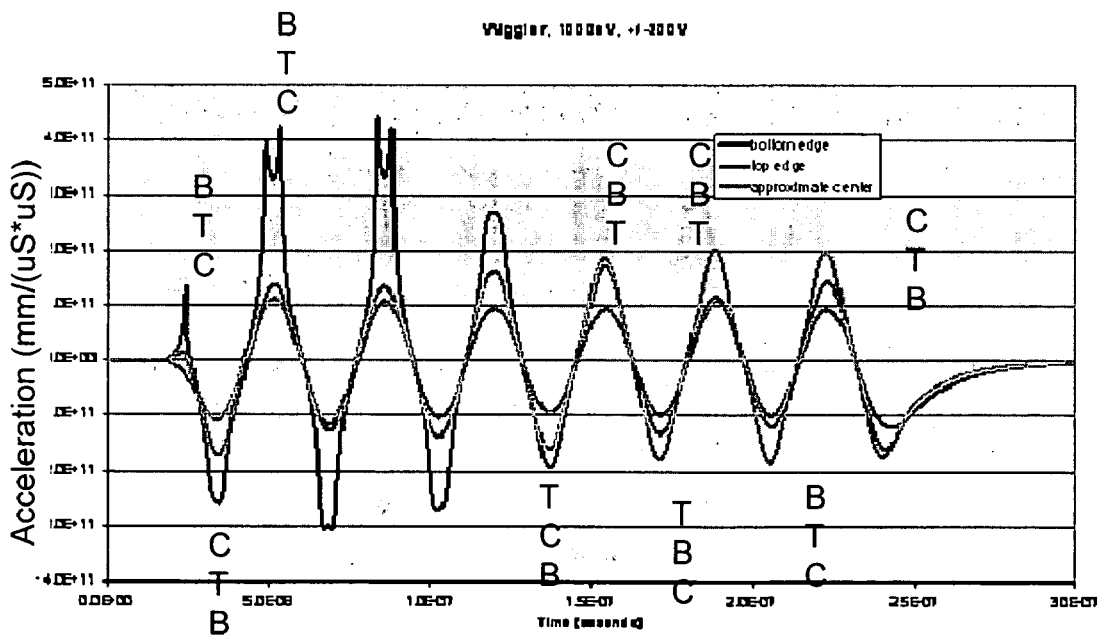
Figure 5C:
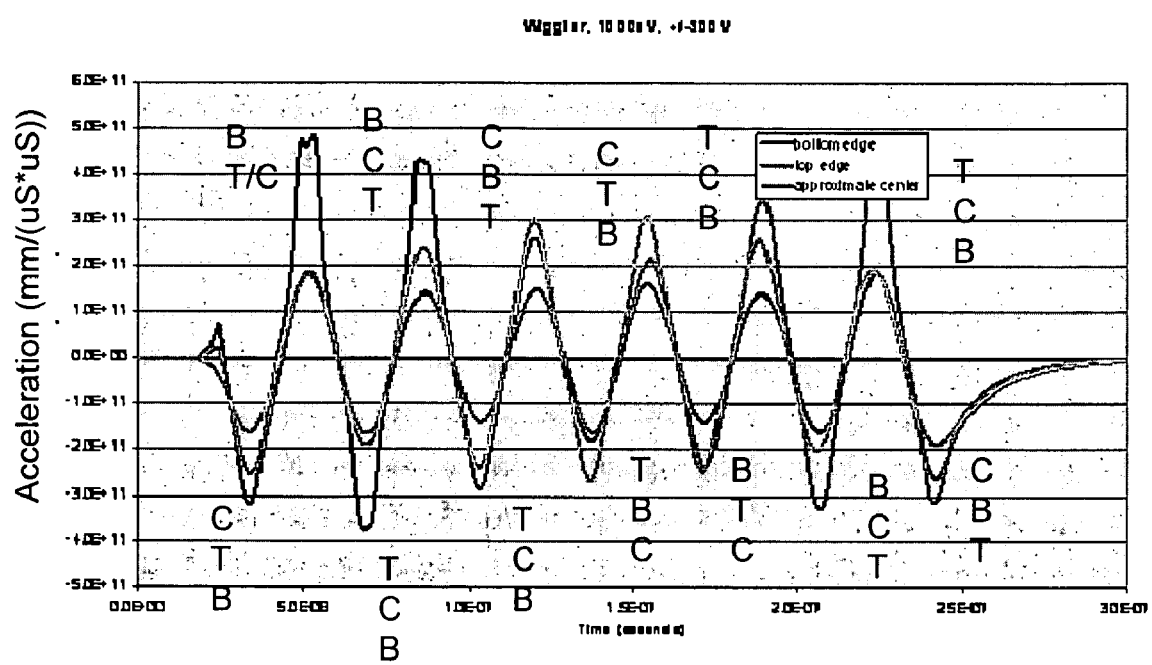

FIGS. 5A-5C are outputs of computer simulations showing trajectories and accelerations of model devices according to the present invention. The outputs illustrate three exemplary paths, labeled "B", "T" and "C" for bottom, top and center, respectively. As shown on FIG. 1, these correspond to charged particles passing through the bottom, top and center, respectively, of the opening between the electrodes 140. Since the curves for B, T and C cross in various locations, the graphs are labeled in various locations. As can be seen in FIG. 5A, the calculations show accelerations of about $0.5 \times 10^{11}$ mm/$\mu S^2$ for electrons with 1 keV of energy passing through a potential of +/−100 volts when passing through the center of the electrodes. FIG. 5B shows accelerations of about $1.0 \times 10^{11}$ mm/$\mu S^2$ for electrons with 1 keV of energy passing through a potential of +/−200 volts when passing through the center of the electrodes. FIG. 5C shows accelerations of about $1.0$-$3.0 \times 10^{11}$ mm/$\mu S^2$ for electrons with 1 keV of energy passing through a potential of +/−300 volts when passing through the center of the electrodes.

Utilizing the alternating electric fields of the present invention, the oscillating charged particles emit photons to achieve a radiation emitting device. Such photons can be used to provide radiation outside the device or to provide radiation for use internally as well. Moreover, the amount of radiation emitted can be used as part of a measurement device. It is also possible to construct the electrode of such a size and spacing that they resonate at or near the frequency that is being generated. This effect can be used to enhance the applied fields in the frequency range that the device emits.

Figure 6:
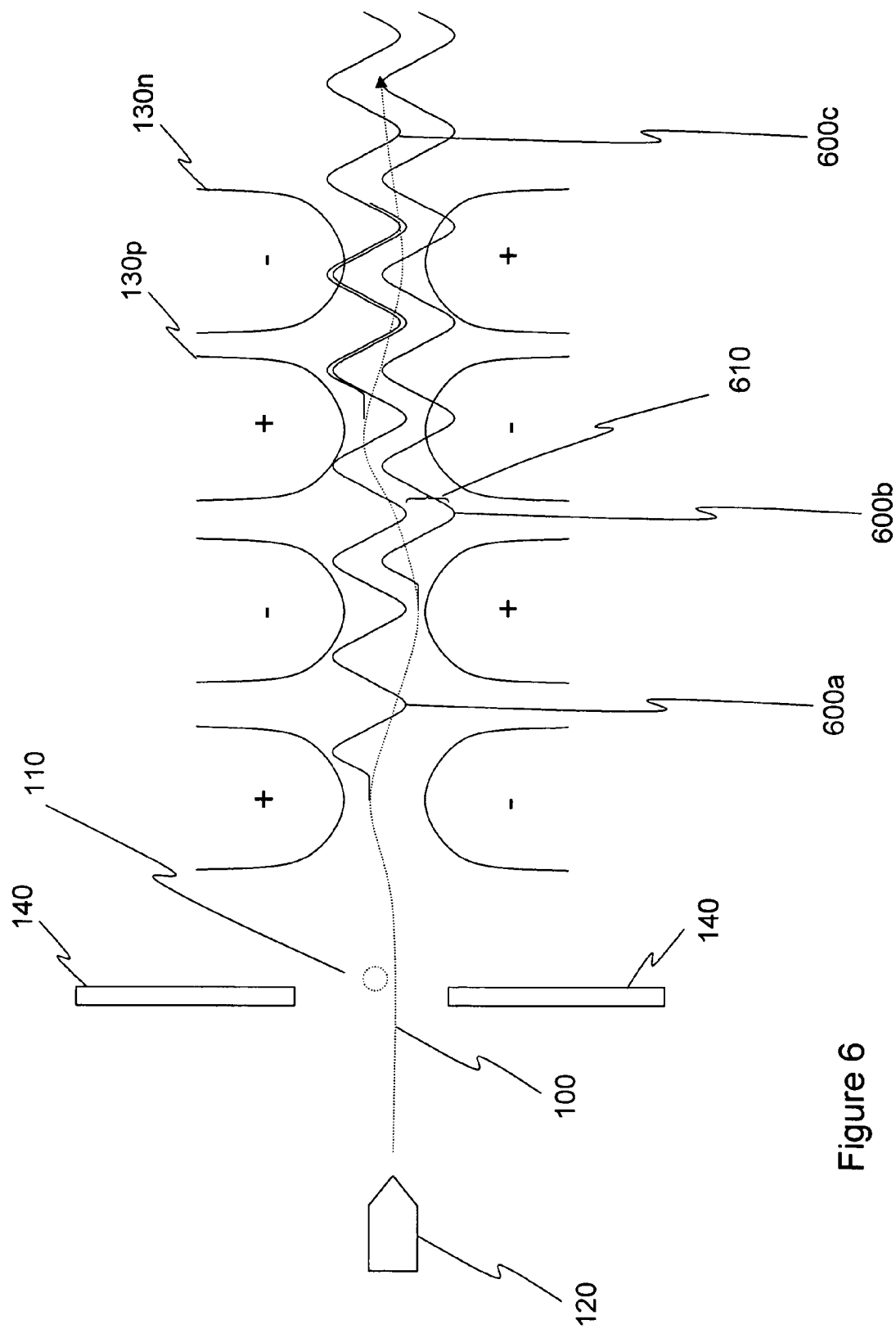
FIG. 6 is a top-view, high-level conceptual representation of a charged particle moving through a series of alternating electric fields according to a first embodiment of the present invention such that photons are emitted in phase with each other.
Figure 7:
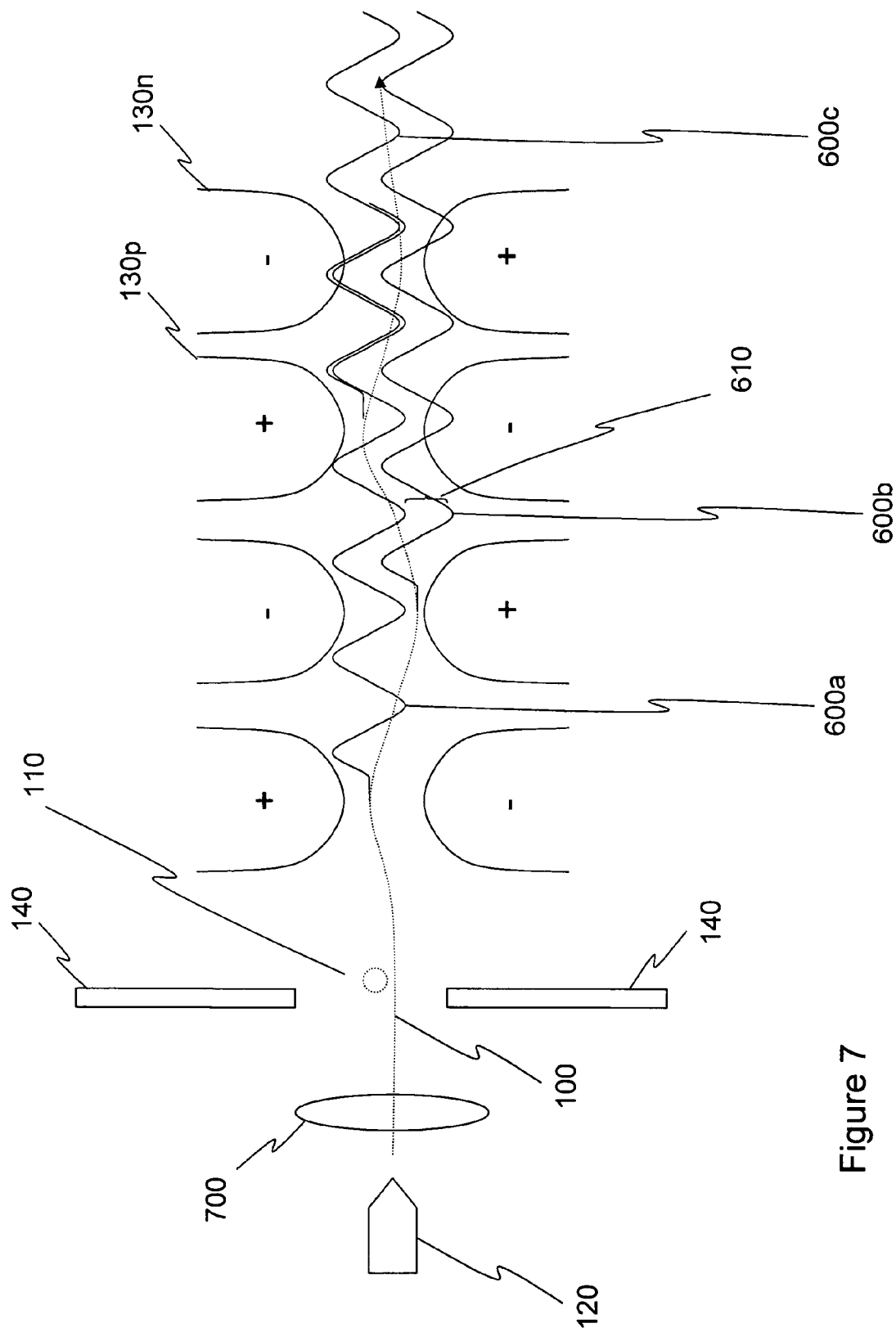
FIG. 7 is a top-view, high-level conceptual representation of a charged particle moving through a series of alternating electric fields according to a second embodiment of the present invention that includes a focusing element.
Figure 8:
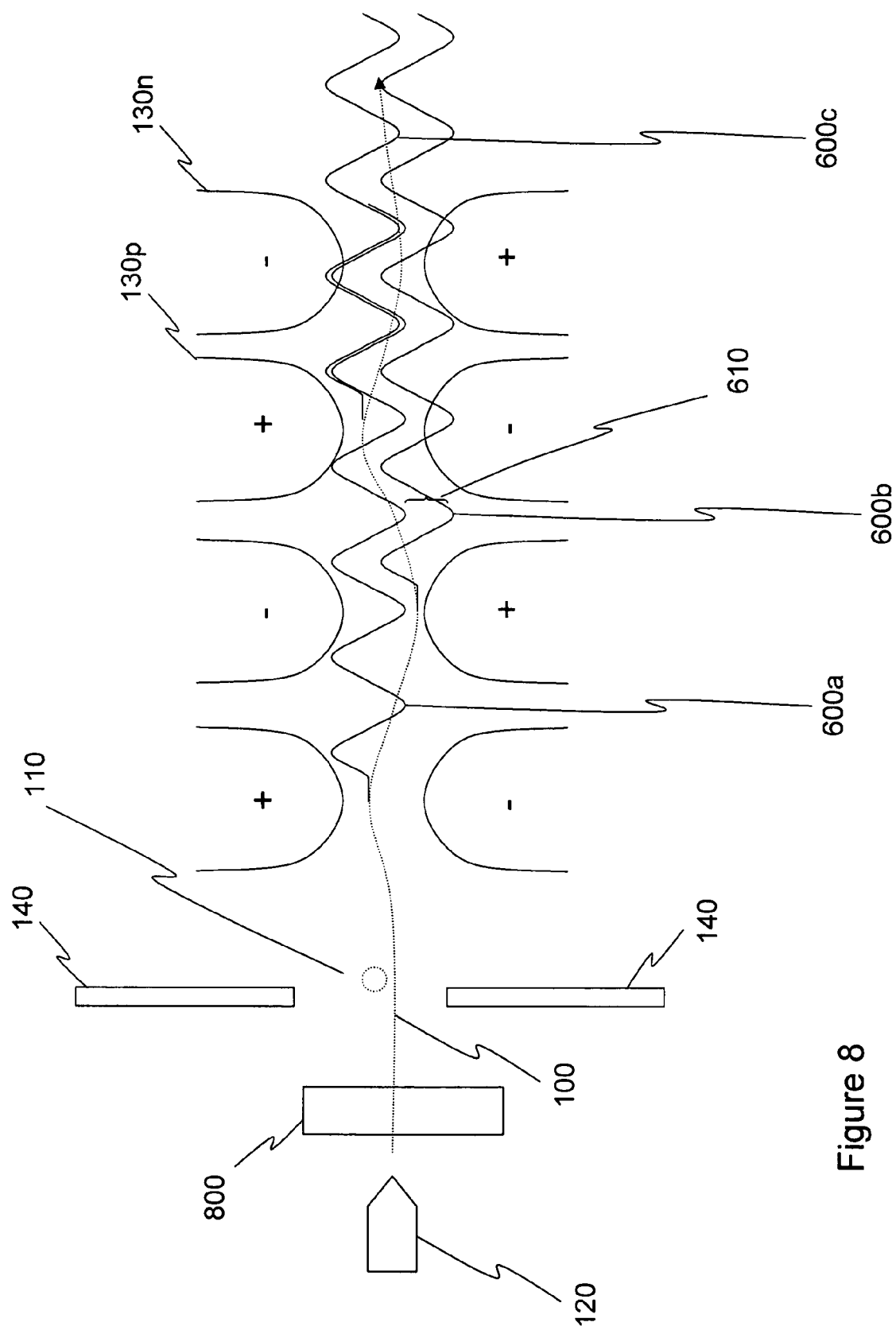
FIG. 8 is a top-view, high-level conceptual representation of a charged particle moving through a series of alternating electric fields according to a third embodiment of the present invention that includes a pre-bunching element.

Turning to FIG. 6, the structure of FIG. 1 has been supplemented with the addition of photons 600a-600c. In the illustrated embodiment, the electric fields 130p and 130n are selected such that the charged particles 110 are forced into an oscillating trajectory at (or nearly at) an integral multiple of the emitted wavelength. Using such a controlled oscillation, the electromagnetic radiation emitted at the maxima and minima of the oscillation constructively interferes with the emission at the next minimum or maximum. As can be seen, for example at 610, the photon emissions are in phase with each other. This produces a coherent radiation source that can be used in laser applications such as communications systems using optical switching.

In light of the variation in paths that a charged particle can undergo based on its initial path between electrodes 140, in a second embodiment of a coherent radiation source, a focusing element 700 is added in close proximity to the electrodes 140. The focusing element 700, while illustrated as being placed before the electrodes 140 may instead be placed after. In such a configuration, additional charged particles may traverse a center path between the fields and undergo constructive interference.

Figure 9A:
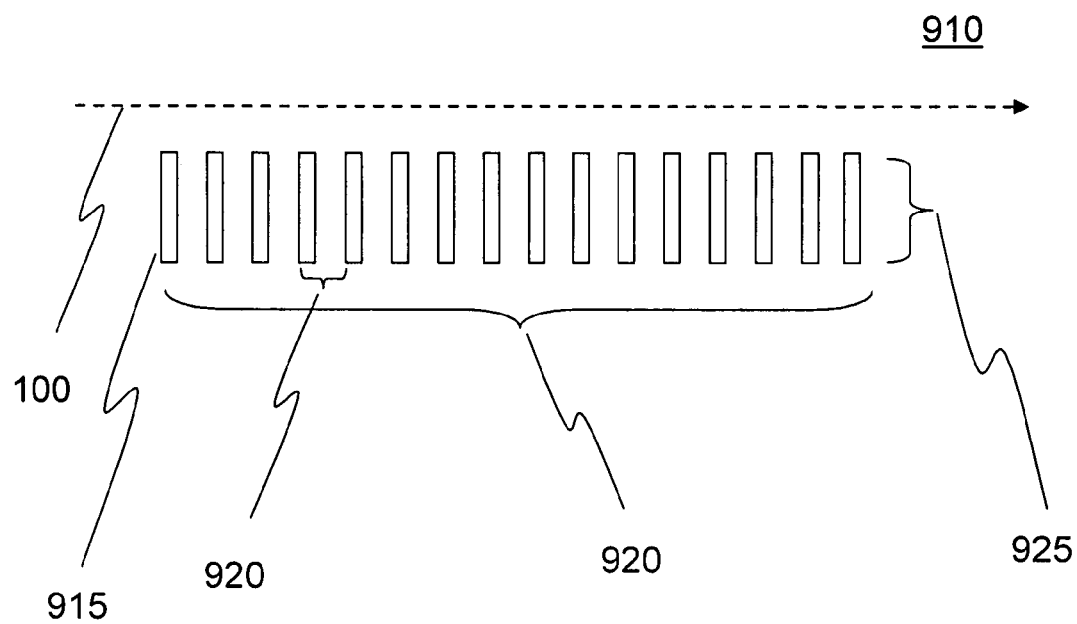
FIGS. 9A through 9H are exemplary resonant structures acting as pre-bunching elements.

In a third embodiment of a coherent light source, a pre-bunching element 800 is added which helps to control the inter-arrival time between charged particles, and therefore aid in the production of coherent Electromagnetic Radiation (EMR). One possible configuration of a pre-bunching element 800 is a resonant structure such as is described in U.S. application Ser. No. 11/410,924, entitled "Selectable Frequency EMR Emitter," filed on Apr. 26, 2006 and incorporated herein by reference. However, exemplary resonant structures are shown in FIGS. 9A-9H. As shown in FIG. 9A, a resonant structure 910 may comprise a series of fingers 915 which are separated by a spacing 920 measured as the beginning of one finger 915 to the beginning of an adjacent finger 915. The finger 915 has a thickness that takes up a portion of the spacing between fingers 915. The fingers also have a length 925 and a height (not shown). As illustrated, the fingers 915 of FIG. 9A are perpendicular to the beam 100.

Resonant structures 910 are fabricated from resonating material [e.g., from a conductor such as metal (e.g., silver, gold, aluminum and platinum or from an alloy) or from any other material that resonates in the presence of a charged particle beam]. Other exemplary resonating materials include carbon nanotubes and high temperature superconductors.

Any of the various resonant structures can be constructed in multiple layers of resonating materials but are preferably constructed in a single layer of resonating material (as described above). In one single layer embodiment, all of the parts of a resonant structure 910 are etched or otherwise shaped in the same processing step. In one multi-layer embodiment, resonant structures 910 of the same resonant frequency are etched or otherwise shaped in the same processing step. In yet another multi-layer embodiment, all resonant structures having segments of the same height are etched or otherwise shaped in the same processing step. In yet another embodiment, all of the resonant structures on a single substrate are etched or otherwise shaped in the same processing step.

The material need not even be a contiguous layer, but can be sub-parts of the resonant structures individually present on a substrate. The materials making up the sub-parts of the resonant structures can be produced by a variety of methods, such as by pulsed-plating, depositing, sputtering or etching. Preferred methods for doing so are described in co-pending U.S. application Ser. No. 10/917,571, filed on Aug. 13, 2004, entitled "Patterning Thin Metal Film by Dry Reactive Ion Etching," and in U.S. application Ser. No. 11/203,407, filed on Aug. 15, 2005, entitled "Method Of Patterning Ultra-Small Structures," both of which are commonly owned at the time of filing, and the entire contents of each of which are incorporated herein by reference.

At least in the case of silver, etching does not need to remove the material between segments or posts all the way down to the substrate level, nor does the plating have to place the posts directly on the bare substrate. Silver posts can be on a silver layer on top of the substrate. In fact, we discovered that due to various coupling effects, better results are obtained when the silver posts are set on a silver layer that is deposited on the substrate.

Figure 9B:
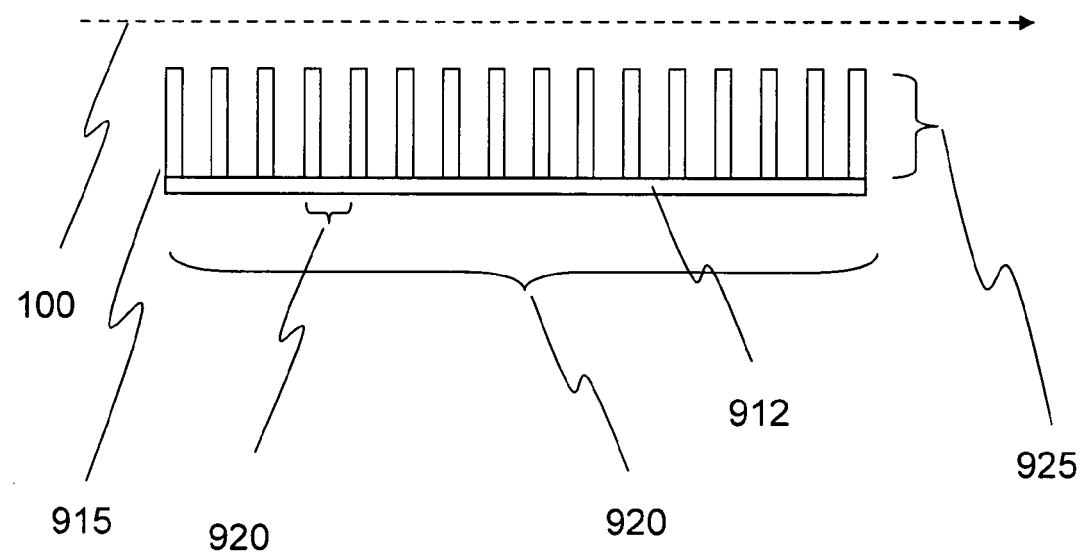
Figure 9C:
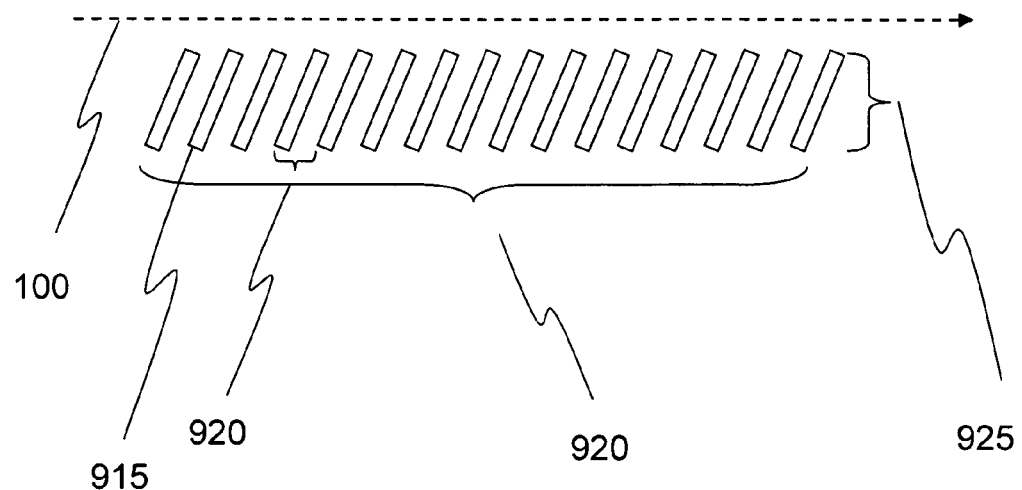
Figure 9D:
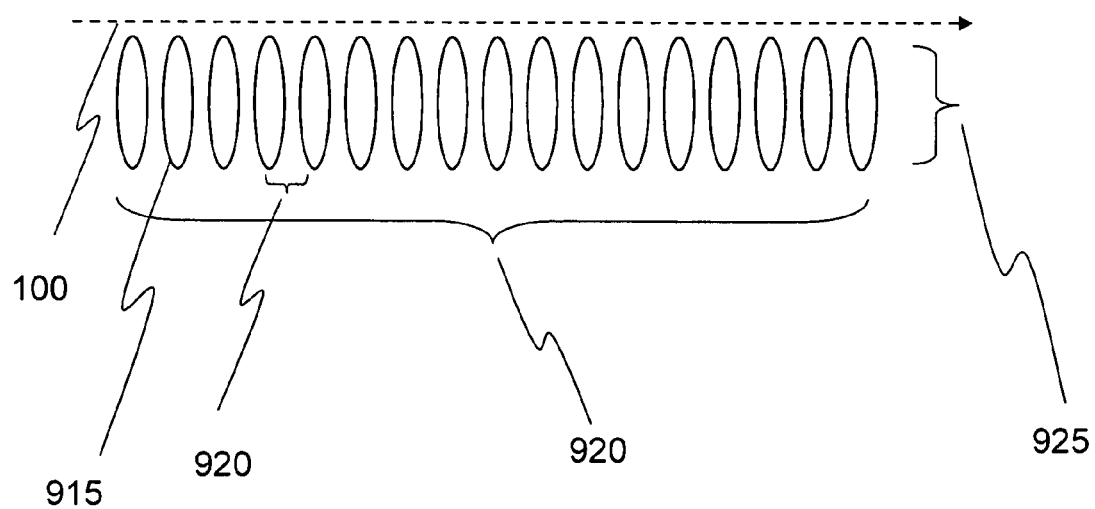
Figure 9E:
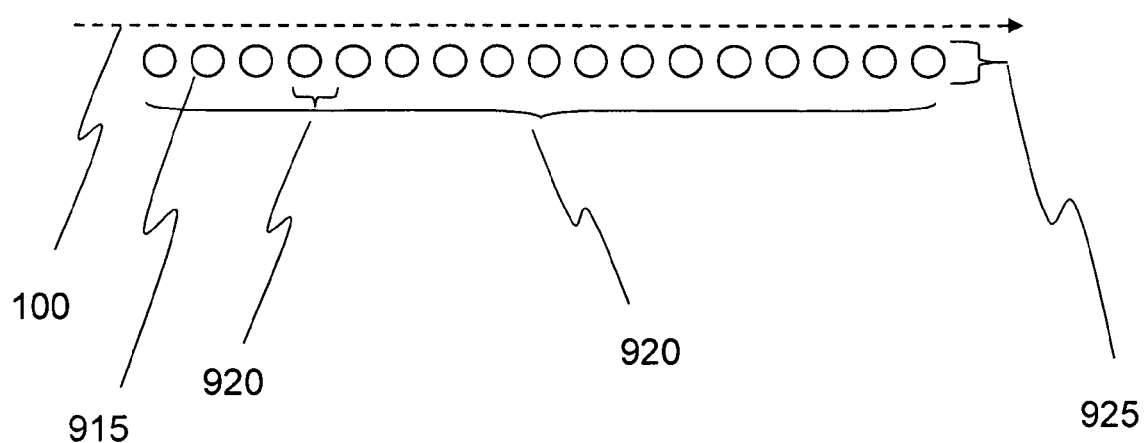
Figure 9F:
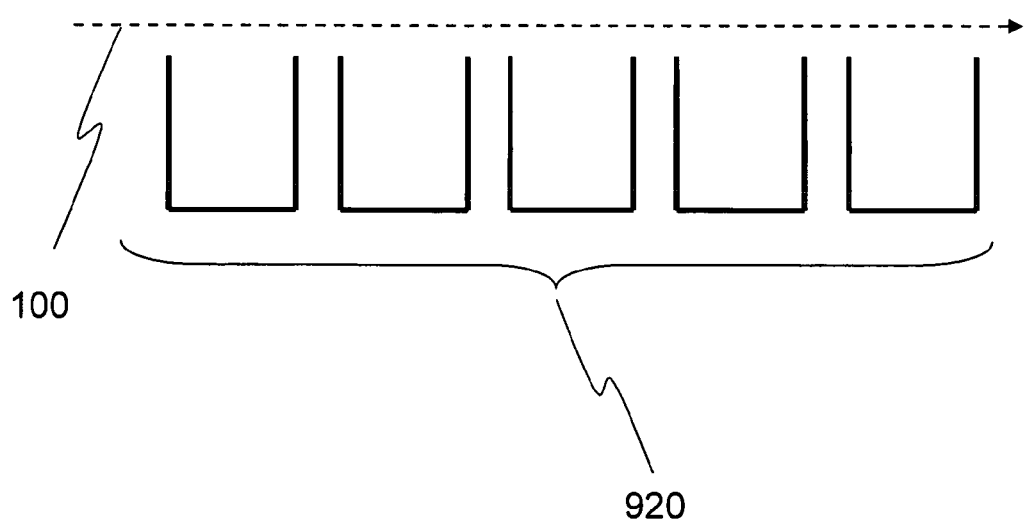
Figure 9G:
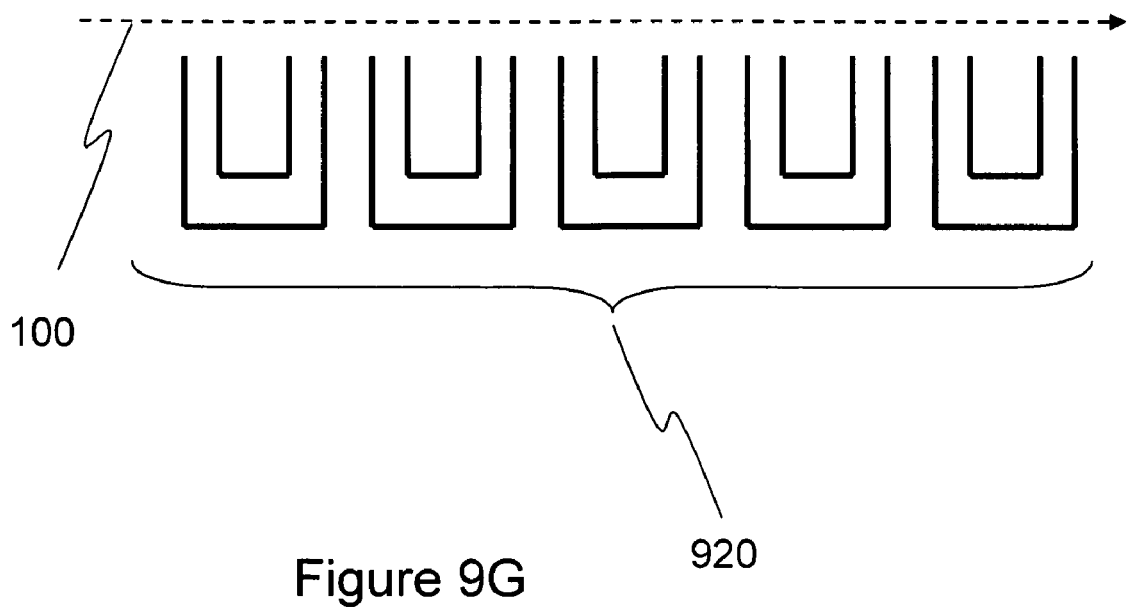
Figure 9H:
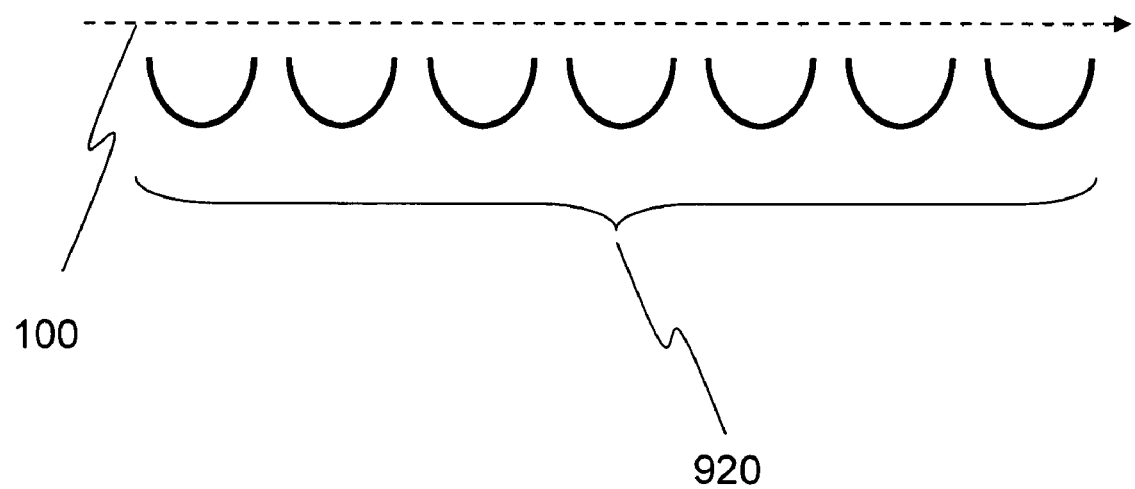

As shown in FIG. 9B, the fingers of the resonant structure 910 can be supplemented with a backbone. The backbone 912 connects the various fingers 915 of the resonant structure 910 forming a comb-like shape. Typically, the backbone 912 would be made of the same material as the rest of the resonant structure 910, but alternative materials may be used. In addition, the backbone 912 may be formed in the same layer or a different layer than the fingers 915. The backbone 912 may also be formed in the same processing step or in a different processing step than the fingers 915. While the remaining figures do not show the use of a backbone 912, it should be appreciated that all other resonant structures described herein can be fabricated with a backbone also.

The shape of the fingers 915 (or posts) may also be shapes other than rectangles, such as simple shapes (e.g., circles, ovals, arcs and squares), complex shapes [e.g., semi-circles, angled fingers, serpentine structures and embedded structures (i.e., structures with a smaller geometry within a larger geometry, thereby creating more complex resonances)] and those including waveguides or complex cavities. The finger structures of all the various shapes will be collectively referred to herein as "segments." Other exemplary shapes are shown in FIGS. 9C-9H, again with respect to a path of a beam 100. As can be seen at least from FIG. 9C, the axis of symmetry of the segments need not be perpendicular to the path of the beam 100.

Exemplary dimensions for resonant structures include, but are not limited to:

(a) period (920) of segments: 150-220 nm;

(b) segment thickness: 75-110 nm;
(c) height of segments: 250-400 nm;
(d) length (925) of segments: 60-180 nm; and
(e) number of segments in a row: 200-300.

While the above description has been made in terms of structures for achieving the acceleration of charged particles, the present invention also encompasses methods of accelerating charged particles generally. Such a method includes: generating a beam of charged particles; providing a series of alternating electric fields along an intended path; and transmitting the beam of charged particles along the intended path through the alternating electric fields.

The resonant structures producing coherent light described above can be laid out in rows, columns, arrays or other configurations such that the intensity of the resulting EMR is increased.

Figure 10:
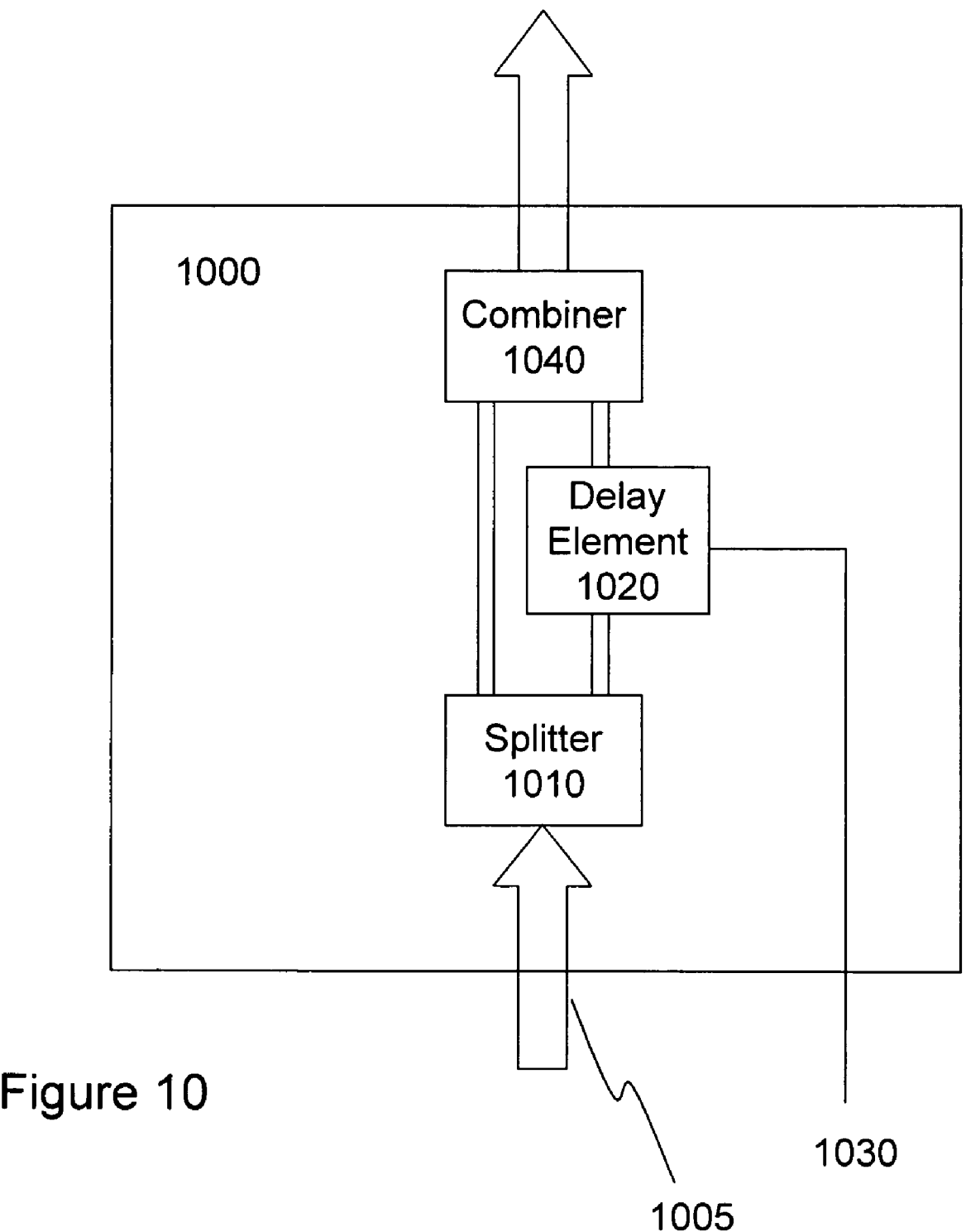
FIG. 10 is a top-level diagram of an electro-optical switching device for controlling a transmission of a coherent light source.

The coherent EMR produced may additionally be used as an input signal to additional devices. For example, the coherent EMR may be used as an input signal to a light amplifier or may be used as part of a transmission system. One such device that the coherent EMR 1005 can be applied to is an electro-optical switch 1000, such as shown in FIG. 10. The coherent EMR 1005 is incident upon a splitter 1010 which divides the coherent EMR 1005 into first and second channels. The first channel is applied to a delay element 1020 controlled by an electrical signal applied to a control terminal 1030. The amount of delay is controlled by whether the electrical signal is active or inactive. The coherent EMR 1005 of the first and second channels is then recombined in a combiner element 1040.

If the signal applied to the control terminal 1030 is in a first state, then there is no delay of the coherent EMR 1005 in the first channel, and the coherent EMR 1005 of the first and second channels are combined constructively such that the EMR passes out of the switch 1000. However, if the signal applied to the control terminal 1030 is in a second state, then there is a delay of the coherent EMR 1005 in the first channel such that the first and second channels become out of phase with respect to each other. Thus, in the second state, the coherent EMR 1005 of the first and second channels are combined destructively and the EMR does not pass out of the switch 1000.

Data to be transmitted can be applied to the control terminal 1030 such that when data is to be transmitted, the EMR is combined in a first way (e.g., constructively), and when data is not to be transmitted, the EMR is combined in a second way (e.g., destructively). The data can be any one or a combination of payload information, header information and trailer information. Exemplary header and trailer information may include, but is not limited to, any necessary start bits, stop bits, and error correction and detection bits (e.g., parity bits). The payload represents the information that is desired to be transmitted, to which a communications controller may add header and trailer information.

The delay element can be made of a number of materials, including electrically-sensitive optically transparent materials such as materials exhibiting the Pockels effect—where a refractive index varies with an applied electric field. One such material is lithium niobate. Other materials, such as the materials used in the optical switching elements of Luxtera, Inc. of Carlsbad, Calif., can be used to produce optical switches for carrying the coherent EMR described above.

By combining the coherent EMR sources described above with optical switching elements in a similar or even identical semiconductor processing environment, the resulting switching devices can enjoy a high degree of integration. However, the optical switching elements may be fabricated in a different integrated circuit than the source of the coherent EMR. The optical switching element may form part of a micro-electro-mechanical systems (MEMS), or may be part of a multi-chip module which is combined with a coherent EMR source.

In addition to using coherent EMR from the above structures using a pre-bunching element and alternating electric fields, it is also possible to utilize EMR emitted directly from a resonant structure that is caused to resonate by passing a beam of charged particles in close enough proximity to its resonant elements, thus allowing for excitation. The frequency of the EMR can be controlled by properly selecting the dimensions of the resonant structure, such as is described in U.S. application Ser. No. 11/410,924, entitled "Selectable Frequency EMR Emitter," filed on Apr. 26, 2006.

As would be understood by one of ordinary skill in the art, the above exemplary embodiments are meant as examples only and not as limiting disclosures. Accordingly, there may be alternate embodiments other than those described above that nonetheless still fall within the scope of the pending claims.

The invention claimed is:

1. A switched optical source comprising:
   a source of charged particles;
   a data input for receiving data to be transmitted;
   a resonant structure configured to be excited by charged particles emitted from the source of charged particles and configured to emit coherent electromagnetic radiation at a predominant frequency representing the data to be transmitted, wherein the predominant frequency has a frequency higher than that of a microwave frequency;
   a splitter for dividing the electromagnetic radiation into first and second channels;
   a delay element controlled by the data received via the data input for selectively delaying the coherent electromagnetic radiation associated with the first channel; and
   a combiner for combining the coherent electromagnetic radiation associated with the second channel with the coherent electromagnetic radiation selectively delayed by the delay element.

2. The switched optical source as claimed in claim 1, wherein the resonant structure, the splitter, the delay element and the combiner are formed in a single integrated circuit.

3. The switched optical source as claimed in claim 1, wherein the resonant structure is formed in a different integrated circuit than the splitter, the delay element and the combiner.

4. The switched optical source as claimed in claim 1, wherein the delay element comprises a material exhibiting the Pockels effect.

5. The switched optical source as claimed in claim 1, wherein the delay element comprises lithium niobate.

6. A switched optical source comprising:
   a data input for receiving data to be transmitted;
   a series of alternating electric fields along an intended path;
   a pre-bunching element;
   a source of charged particles configured to transmit charged particles along an oscillating trajectory through the pre-bunching element and through the series of alternating electric fields, wherein the oscillating trajectory has a wavelength close to that of coherent radiation emitted from the charged particles during oscillation and wherein the coherent radiation emitted from the charged particles undergoes constructive interference;
   a splitter for dividing the coherent electromagnetic radiation into first and second channels;

a delay element controlled by the data received via the data input for selectively delaying the coherent electromagnetic radiation associated with the first channel; and a combiner for combining the coherent electromagnetic radiation associated with the second channel with the coherent electromagnetic radiation selectively delayed by the delay element.

7. The switched optical source as claimed in claim 6, wherein the pre-bunching element, the splitter, the delay element and the combiner are formed in a single integrated circuit.

8. The switched optical source as claimed in claim 6, wherein the pre-bunching element is formed in a different integrated circuit than the splitter, the delay element and the combiner.

9. The switched optical source as claimed in claim 6, wherein the delay element comprises a material exhibiting the Pockels effect.

10. The switched optical source as claimed in claim 6, wherein the delay element comprises lithium niobate.

* * * * *